United States Patent
Pingel et al.

(10) Patent No.: US 9,143,563 B2
(45) Date of Patent: Sep. 22, 2015

(54) INTEGRATED AND SCALABLE ARCHITECTURE FOR ACCESSING AND DELIVERING DATA

(71) Applicant: Rockwell Automation Technologies, Inc., Mayfield Heights, OH (US)

(72) Inventors: Jan Pingel, Charlotte, NC (US); Michael John Pantaleano, Willoughby, OH (US); Chirayu Shah, Pewaukee, WI (US); Todd M. Smith, Chagrin Falls, OH (US); Matthew C. Giordano, Powell, OH (US); Rainer Hessmer, Rancho Santa Margarita, CA (US); Kermit George Peters, Rancho Santa Margarita, CA (US); Neville Patrick van der Merwe, Rancho Santa Margarita, CA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 15 days.

(21) Appl. No.: 13/663,928

(22) Filed: Oct. 30, 2012

(65) Prior Publication Data

US 2013/0124465 A1    May 16, 2013

Related U.S. Application Data

(60) Provisional application No. 61/558,798, filed on Nov. 11, 2011.

(51) Int. Cl.
*G06F 17/30* (2006.01)
*H04L 29/08* (2006.01)
(Continued)

(52) U.S. Cl.
CPC .......... *H04L 67/1095* (2013.01); *G06F 3/0604* (2013.01); *G06F 3/067* (2013.01);
(Continued)

(58) Field of Classification Search
USPC ......................................... 707/200, 763, 692
See application file for complete search history.

(56) References Cited

U.S. PATENT DOCUMENTS

| | | | |
|---|---|---|---|
| 5,832,522 | A | 11/1998 | Blickenstaff et al. |
| 7,412,534 | B2 * | 8/2008 | Tsang et al. ................. 709/231 |

(Continued)

FOREIGN PATENT DOCUMENTS

| | | |
|---|---|---|
| CN | 1495635 A | 5/2004 |
| GB | 2468291 A | 9/2010 |

(Continued)

OTHER PUBLICATIONS

European Search Report for European Patent Application No. EP12192277 dated Apr. 29, 2013, 6 pages.

(Continued)

*Primary Examiner* — Mariela Reyes
*Assistant Examiner* — Thong Vu
(74) *Attorney, Agent, or Firm* — Amin, Turocy & Watson, LLP

(57) ABSTRACT

A distributed and scalable data historian framework is provided that allows historian functionality to be efficiently incorporated at various levels of an industrial enterprise. The framework includes a historian data interface system that provides a single interface and common protocol for configuring, managing, and viewing historian data located throughout a network of historian distributed across the industrial enterprise. The historian data interface system leverages a data model that models the enterprise and sources of historian data to facilitate fast and efficient retrieval of desired historian data. By unifying the distributed historians under a common framework, the data model can facilitate enterprise-level management of historian data collection and storage.

22 Claims, 20 Drawing Sheets

(51) Int. Cl.
*G06F 3/06* (2006.01)
*G06F 11/34* (2006.01)
*G06Q 10/06* (2012.01)
*H04L 12/24* (2006.01)

(52) U.S. Cl.
CPC ......... *G06F 3/0647* (2013.01); *G06F 11/3495* (2013.01); *G06F 17/30557* (2013.01); *G06Q 10/0637* (2013.01); *H04L 41/069* (2013.01); *H04L 67/12* (2013.01); *G06F 11/3409* (2013.01); *G06F 11/3423* (2013.01)

(56) References Cited

U.S. PATENT DOCUMENTS

| | | | |
|---|---|---|---|
| 8,275,766 B2 * | 9/2012 | Ball et al. | 707/727 |
| 8,407,190 B2 * | 3/2013 | Prahlad et al. | 707/692 |
| 8,671,105 B2 * | 3/2014 | Reddy et al. | 707/763 |
| 2004/0078228 A1 * | 4/2004 | Fitzgerald et al. | 705/2 |
| 2005/0050054 A1 * | 3/2005 | Clark et al. | 707/100 |
| 2005/0154821 A1 | 7/2005 | Furuhashi et al. | |
| 2007/0028054 A1 * | 2/2007 | Naryzhny et al. | 711/133 |
| 2008/0263103 A1 * | 10/2008 | McGregor et al. | 707/200 |
| 2009/0077055 A1 * | 3/2009 | Dillon et al. | 707/5 |
| 2010/0174708 A1 | 7/2010 | Ball et al. | |
| 2011/0246427 A1 | 10/2011 | Modak et al. | |
| 2012/0005220 A1 * | 1/2012 | Schindlauer et al. | 707/769 |
| 2012/0303629 A1 * | 11/2012 | Klein et al. | 707/741 |
| 2012/0323938 A1 * | 12/2012 | Skeen et al. | 707/754 |

FOREIGN PATENT DOCUMENTS

| | | |
|---|---|---|
| WO | 2005029314 A1 | 3/2005 |
| WO | 2011077116 A1 | 6/2011 |

OTHER PUBLICATIONS

Chinese Office Action dated Dec. 3, 2014 for Chinese Application No. 201210452531.5, 14 pages. (with translation).

* cited by examiner

Select Points For Trend Chart

Point Name [ ]  Point Type [ ]  Archiving [ ]

Point Source [ ]  Scan Rate [ ]  Scan [ ]

Points

| Value | Timestamp | Type | Select |
|---|---|---|---|
| 0_1_0int32tag212 | 485 | Wednesday, July 22, 2009, 14:22 | Int32 | ☐ |
| 0_1_0int32tag658 | 931 | Wednesday, July 22, 2009 | Int32 | ☑ |
| 0_1_0int32tag598 | 871 | Wednesday, July 22, 2009 | Int32 | ☑ |
| 0_1_0int32tag820 | 1093 | Wednesday, July 22, 2009 | Int32 | ☐ |
| 0_1_0int32tag225 | 498 | Wednesday, July 22, 2009 | | |

Trend Chart

Start Time [ ]  End Time [ ]

FIG. 12

INTEGRATED AND SCALABLE ARCHITECTURE FOR ACCESSING AND DELIVERING DATA

RELATED APPLICATIONS

This application claims the benefit of U.S. Provisional Patent Application Ser. No. 61/558,798, filed on Nov. 11, 2011, and entitled "INTEGRATED AND SCALABLE ARCHITECTURE FOR ACCESSING AND DELIVERY OF DATA," the entirety of which is incorporated herein by reference.

TECHNICAL FIELD

The subject invention relates generally to industrial control systems, and more particularly to an integrated and scalable architecture that provides a common data model for capturing and managing historical data in an industrial controller environment.

BACKGROUND

Industrial controllers are special-purpose computers utilized for controlling industrial processes, manufacturing equipment, and other factory automation, such as data collection or networked systems. Logic processors, such as Programmable Logic Controllers (PLCs) or PC-based controllers, are at the core of the industrial control system. Industrial controllers are typically programmed by systems designers to operate manufacturing processes via user-designed logic programs or user programs. The user programs are stored in memory and can be executed by the industrial controller in a generally sequential manner although instruction jumping, looping and interrupt routines are also common. The user program is typically associated with a plurality of memory elements, registers, and/or variables that provide dynamics to controller operations and programs. Different types of industrial controllers are often distinguished by the number of inputs and outputs (I/O) the controllers are able to process, the amount of memory, the number and type of instructions supported by the controller's instruction palette, and speed of the controller's central processing unit (CPU).

Industrial controllers interact with field devices on the plant floor to control automated processes relating to such objectives as product manufacture, material handling, batch processing, supervisory control, and other such applications. Industrial controllers store and execute the user-defined control programs to effect decision-making in connection with the controlled process. Such programs can include, but are not limited to, ladder logic, sequential function charts, function block diagrams, structured text, or other such platforms In a more macro sense relative to the controller, businesses have become progressively more complex in that higher order business systems or computers often need to exchange data with such industrial controllers. For instance, an industrial automation enterprise may include several plants in different locations. Driven by such considerations as increased efficiency, productivity improvement, and cost-reduction, manufacturers are becoming more interested in collecting, analyzing, and optimizing data and metrics from global manufacturing sites. For example, a food company may have several plants located across the globe for producing a certain brand of food. In the past, these factories were standalone and generally isolated from one another, rendering data collection and comparison of metrics between facilities difficult. In today's networked world, manufacturers are demanding real-time data from their factories to drive optimization and productivity.

Moreover, manufacturers are faced with a growing obligation to comply with regulatory record-keeping and reporting (e.g., the Food and Drug Administration's CFR Part 11 requirements, emissions reporting, quality reporting, etc.). Some industrial systems must also leverage historical data in order to perform process analytics, such as comparing current process states with prior states (e.g., batch comparison, process optimization etc.), analyzing production or machine metrics over time, creating totalizers (e.g., means, max, etc.), performing advanced analysis using historical data to optimize a current process in real time, or other such operations. To collect industrial data necessary for such analytics, some systems employ a PC-historian, which is an industrial computer configured to capture data from industrial controllers.

However, there are disadvantages to existing data collection and storage solutions. For example, conventional PC-historians are not tightly integrated with standard control systems, limiting overall data collection performance and abilities. PC-historians are generally applied on the back-end of system design, and are therefore loosely coupled or integrated within the framework of the control architecture. The relatively loose integration between historians and the control system can render configuration and deployment more complex and costly. This can also complicate the process of identifying which sets of data should or should not be captured.

There are also difficulties associated with mapping and integrating historians into a larger enterprise. For example, an enterprise may employ a common scheme that defines security for underlying control components of an industrial system. Since current historian systems are conventionally applied outside the control system framework, historian components may, at best, provide their own security implementation but may not be integrated in the enterprise's security framework with other similarly situated components, including enterprise control components at higher levels of the enterprise.

The above-described deficiencies of today's industrial control systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a distributed and scalable framework that enables data historian functionality to be efficiently incorporated and managed in a layered architecture. To this end, a historian data interface system is provided that facilitates configuration, management, and viewing of distributed historian data using a single interface and using a common protocol. The historian data interface system leverages a data model that models an industrial enterprise and sources of historian data distributed across multiple levels of the enterprise. The data model exposes contexts and historian data to other components of the enterprise, and allows the interface system to determine correlations between diverse historian tags located throughout the enterprise. The data model can also facilitate aggregation of data to promote efficient storage, access, and retrieval, where aggregation can be a function of data relevancy, age, redundancy, historical access patterns, etc.

The historian data interface system can employ historian tags or other identifiers to facilitate data access and storage across a pool of historians. The common interface can present a single unified interface that allows the user to locate and view desired historian data without prior knowledge of the data's location within the enterprise. The system allows historian data to be accessed from any suitable device operatively coupled to the common interface.

Other features include alarm and event notification for historian components, single point client programming for historian components across an organization, and provision of services to collect and report historian data at different levels of the organization.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 12 illustrates an exemplary display screen for configuring and viewing trend charts that utilize historian data.

DETAILED DESCRIPTION

Figure 1:
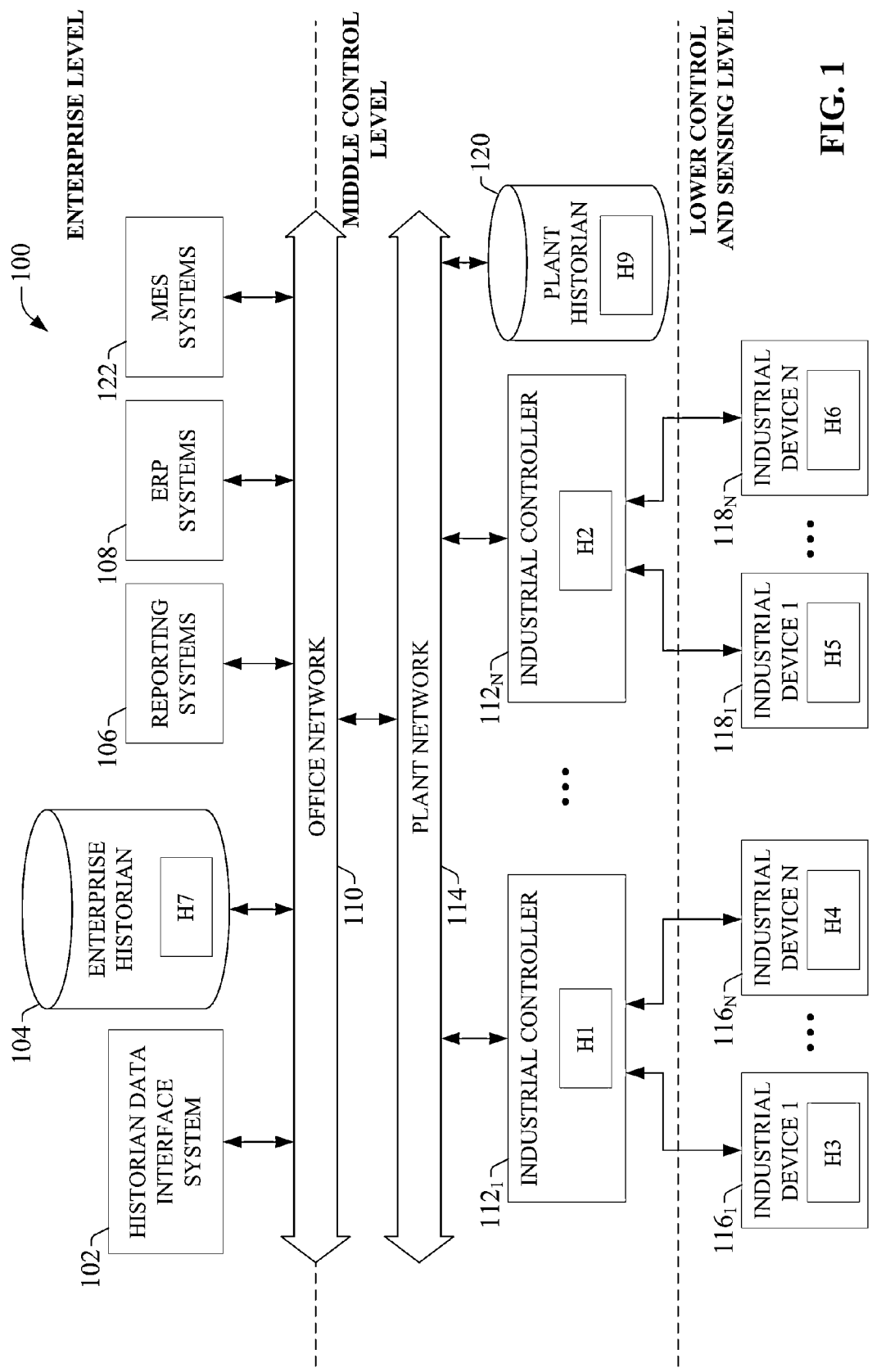
FIG. 1 is a high-level overview of an exemplary industrial enterprise having historians at various hierarchical levels.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of an exemplary industrial enterprise 100 having data storage devices (e.g., historians) at various hierarchical levels. The exemplary enterprise 100 comprises a lower control and sensing level, a middle control level, and an enterprise level. However, it is to be appreciated that the integrated architecture described herein is suitable for use in any industrial environment comprising any configuration of enterprise levels.

The lower control and sensing level comprises industrial devices $116_{1-N}$ and $118_{1-N}$, which are monitored and controlled by industrial controllers $112_{1-N}$. Industrial devices $116_{1-N}$ and $118_{1-N}$ can comprise field devices and systems that provide data to or receive data from the industrial controllers $112_{1-N}$ in connection with monitor and control of one or more industrial processes carried out on the plant floor. Accordingly, industrial devices $116_{1-N}$ and $118_{1-N}$ can include such controller input devices as sensors, telemetry devices, meters, or the like. Industrial devices $116_{1-N}$ and $118_{1-N}$ can also include controller output devices, such as actuators, motor drives and contactors, or other such controllable devices. Industrial devices $116_{1-N}$ and $118_{1-N}$ may also include low-level control systems, such as vision systems, barcode marking systems, variable frequency drives, industrial robots, and the like which perform local control of portions of the industrial process, or which have their own localized control systems, but which are subservient to the industrial controllers $112_{1-N}$ on the middle control layer.

Industrial controllers $112_{1-N}$ can be, for example, programmable logic controllers (PLCs) or other programmable automation controllers (PACs), and facilitate monitor and control of one or more industrial automation systems via the industrial devices $116_{1-N}$ and $118_{1-N}$. Exemplary automation systems can include, but are not limited to, batch control systems (e.g., mixing systems), continuous control systems (e.g., PID control systems), or discrete control systems. The controllers exchange data with the industrial devices $116_{1-N}$ and $118_{1-N}$ using native hardwired I/O or via a plant network such as Ethernet/IP, Data Highway Plus, ControlNet, Devicenet, or the like. Industrial controllers $112_{1-N}$ typically receive any combination of digital or analog signals from the industrial devices $116_{1-N}$ and $118_{1-N}$ indicating a current state of the devices and their associated processes (e.g., temperature, position, part presence or absence, fluid level, etc.), and execute user-defined control programs that perform automated decision-making for the controlled processes based on the received signals. Industrial controllers $112_{1-N}$ then output digital and/or analog control signaling to the industrial devices $116_{1-N}$ and $118_{1-N}$ in accordance with the decisions made by the control program. These outputs can include device actuation signals, temperature or position control signals, motion control commands, operational commands to a machining or material handling robot, mixer control signals, and the like. The control programs can comprise any suitable type of code used to process input signals read into the industrial controllers $112_{1-N}$ and to control output signals generated by the industrial controllers $112_{1-N}$, including but not limited to ladder logic, sequential function charts, function block diagrams, structured text, or other such platforms.

In exemplary enterprise 100, industrial controllers $112_{1-N}$ reside on plant network 114, which provides networked connectivity between controllers $112_{1-N}$. One or more of industrial devices $116_{1-N}$ and $118_{1-N}$ may also reside on plant network 114. Plant network 114 can utilize any suitable networking architecture and protocol, including, but not limited to, Control and Information Protocol (CIP), Ethernet, Ethernet/IP, Data Highway Plus, ControlNet, Devicenet, or the like.

The enterprise level can comprise the business side of the enterprise, and can include such business operations as financial analysis, marketing, sales, order management, long term business planning, resource management, inventory management, and the like. The enterprise level can also include systems that leverage industrial data generated by and received from the plant-floor levels, such as reporting systems 106, Enterprise Resource Planning (ERP) system 108, and Manufacturing and Execution (MES) system 122. These enterprise-level systems correlate and manage high-level business functions in view of plant floor operations. An office network 110 can interconnect one or more office systems residing on the enterprise level using a suitable office network protocol (e.g., TCP/IP over Ethernet). For example, office network 110 can interconnects employee desktop or laptop computers to an office server, printing devices, or other office equipment.

Office network 110 may also be connected to plant network 114 (e.g., through a router or firewall) to facilitate aggregation of data from the plant floor at the enterprise level. Accordingly, exemplary enterprise 100 can include an enterprise historian 104, which provides long-term enterprise-level storage of plant floor or business-side data collected from one or more facilities comprising the enterprise.

Devices on the middle control level and the lower control and sensing level can generate large amounts of data relating to control and monitoring of one or more industrial automation systems. Accordingly, a plant historian 120 can be provided on the plant network 114 to aggregate and store data generated by one or more of the industrial controllers $112_{1-N}$ and/or the industrial devices $116_{1-N}$ and $118_{1-N}$. Moreover, any of the industrial controllers $112_{1-N}$ and/or the industrial devices $116_{1-N}$ and $118_{1-N}$ may have associated therewith respective embedded historians, also referred to as micro historians (e.g., historians H1-H6). Micro historians H1-H6 act as local storage for the data generated by the respective devices.

As illustrated in FIG. 1, historians H1-HN are distributed across various levels of the industrial enterprise to facilitate data collection across the organizational hierarchy. Each of historians H1-HN can offer a platform that provides high speed, time series data storage and retrieval from multiple controllers or devices. Historians H1-HN can communicate with industrial controllers $112_{1-N}$ and industrial devices $116_{1-N}$ and $118_{1-N}$ through standard network interfaces or across the controllers' respective backplanes. In some implementations, the respective historians H1-HN can archive data to an Archive Engine that provides additional storage capabilities.

In some implementations, one or more of the historians H1-HN can comprise live data servers, which hold live (e.g., near real-time) data which can then historized to other long-term historians for archival storage. Live data maintained by such live data servers can include, for example, near real-time telemetry or status data generated by industrial controllers $112_{1-N}$ and/or industrial devices $116_{1-N}$ and $118_{1-N}$). In an exemplary implementation, such live data can be aggregated from multiple controllers or devices to a common live data server, which provides external applications a means to access and view this live data. The live data can then be moved to a plant level or enterprise level historian for longer term storage. As will be explained in more detail below, the historian data interface system and associated model can provide access to both live data components and historical data components from a common interface.

One or more embodiments of the present disclosure provide tools for correlating, viewing, and managing the data stored across the enterprise in historians H1-HN. To this end, a historian data interface system 102 can provide a common interface for distributed historians H1-HN that allows users to access the historian data, facilitates creation of meaningful views of the data, and provides other features to be described in more detail herein. Historian data interface system 102 can correlate the respective historians H1-HN residing on the multiple levels of the enterprise such that data stored on any historian can be seamlessly accessed from a common interface or through a common protocol.

Figure 2:
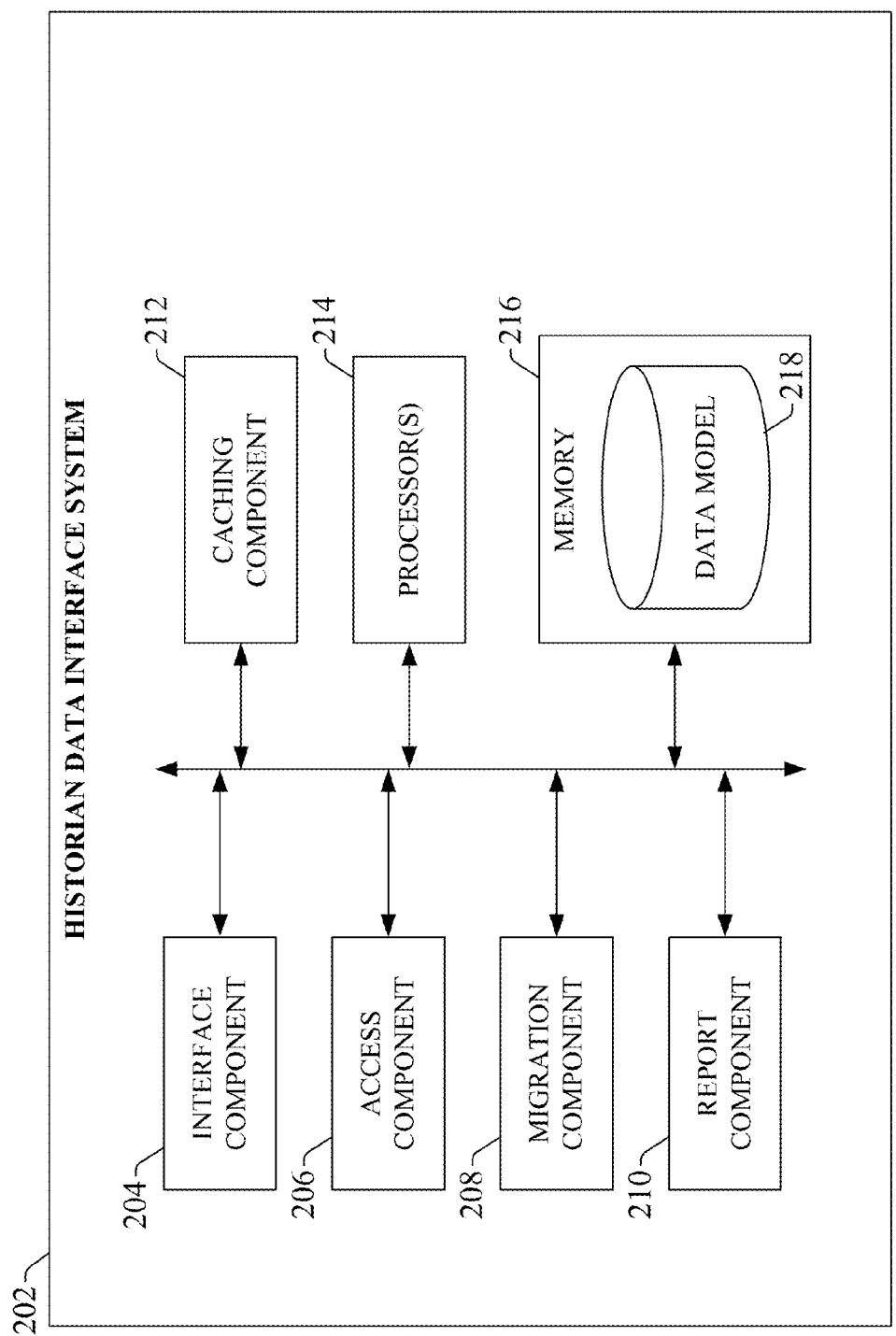
FIG. 2 is a block diagram of an exemplary historian data interface system that can provide a common interface and protocol for accessing distributed historian data.

FIG. 2 is a block diagram of an exemplary historian data interface system that can provide a common interface and protocol for accessing distributed historian data. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Historian data interface system 202 can include an interface component 204, an access component 206, a migration component 208, a report component 210, a caching component 212, one or more processors 214, and memory 216. In various embodiments, one or more of the historian data interface component 204, access component 206, migration component 208, report component 210, caching component 212, one or more processors 214, and memory 216 can be electrically and/or communicatively coupled to one another to perform one or more of the functions of the historian data interface system 202. In some embodiments, components 204, 206, 208, 210, and 212 can comprise software instructions stored on memory 216 and executed by processor(s) 214. The historian data interface system 202 may also interact with other hardware and/or software components not depicted in FIG. 2. For example, processor(s) 214 may interact with one or more external user interface devices, such as a keyboard, a mouse, a display monitor, a touchscreen, or other such interface devices.

Interface component 204 can be configured to receive requests for access to selected historian data and present the requested data via an interface device. Access component 206 can be configured to locate and retrieve desired historian data stored in a mesh network of data historians, including determining a most efficient path between the desired data and request originator. Migration component 208 can be configured migrate data to different storage locations to improve efficiency of storage and retrieval of the data. Report component 210 can be configured to generate reports based on the historian data, associated alarms, notifications, and the like. Caching component 212 can be configured to selectively store historian data to facilitate servicing high-speed requests for the data. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed. In some embodiments, memory 216 can be cloud-based storage provided by the cloud platform that maintains and executes the cloud-based historian data interface system 202.

Figure 3:
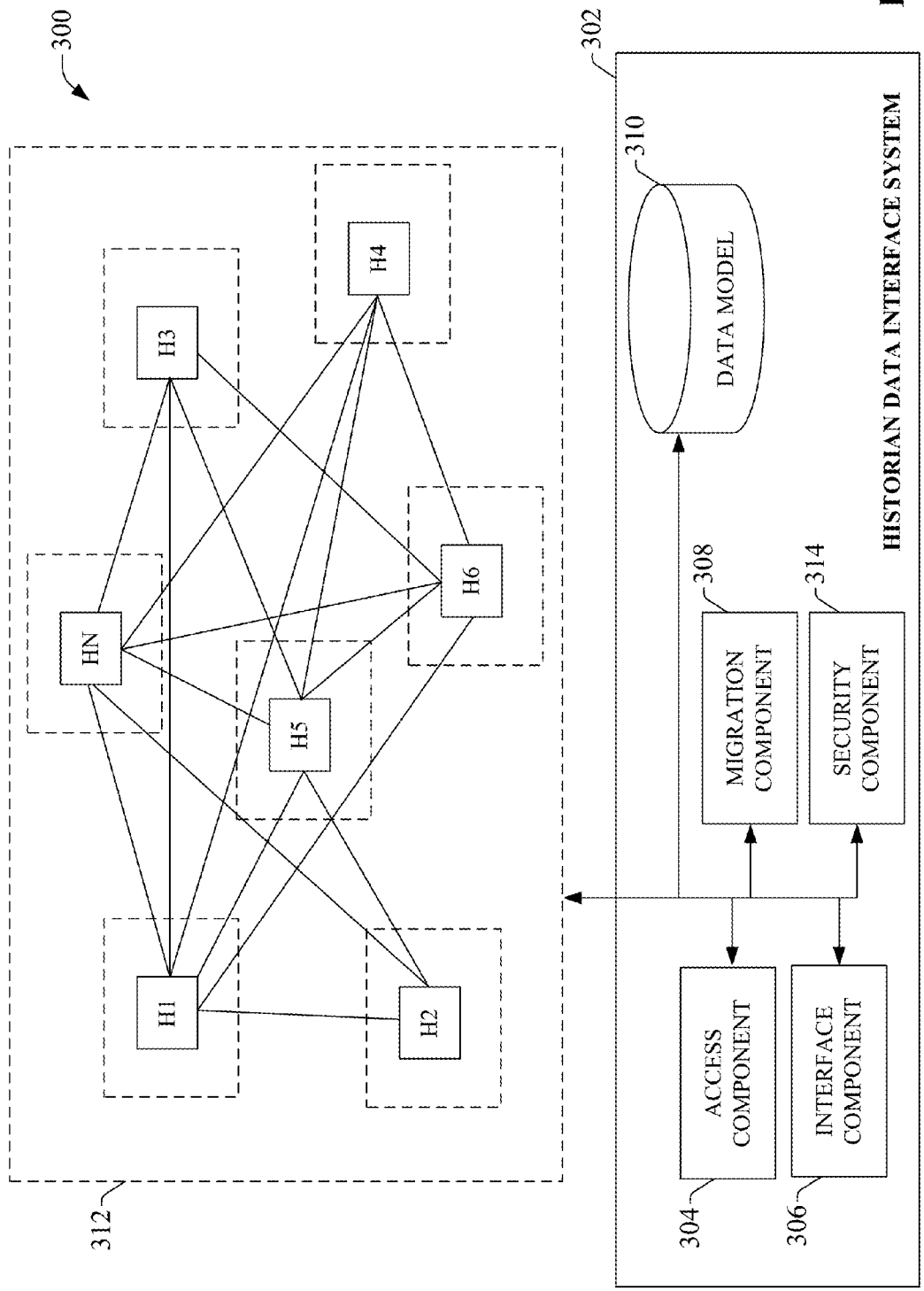
FIG. 3 is a high-level overview of a distributed and scalable framework that enables data historian functionality to be efficiently incorporated at various levels of an enterprise.

FIG. 3 illustrates a distributed and scalable framework 300 that enables data historian functionality to be efficiently incorporated at various levels of an enterprise. Similar to the historians depicted in FIG. 1, historians H1-HN are distributed across multiple levels of an industrial enterprise (e.g., enterprise 100 of FIG. 1). Historian data interface system 302 provides a common interface and accessing protocol that allows the historians H1-HN to be managed as a mesh network 312, whereby the respective historians H1-HN are correlated such that data stored thereon can be seamlessly accessed from a common interface. Although various embodiments are described herein within the context of historians (e.g., mesh network of historians), it is to be appreciated that the embodiments are not limited to historians, but rather are applicable to any suitable storage devices.

Framework 300, as managed by historian data interface system 302, leverages a common data model 310 that allows the historians H1-HN to expose their contexts and data to other components of the enterprise, and to automatically recognize and collect relevant data (e.g., for archival, system restoration purposes, etc.). In one or more embodiments, data model 310 can represent the industrial enterprise in terms of multiple hierarchical levels, where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Figure 4:
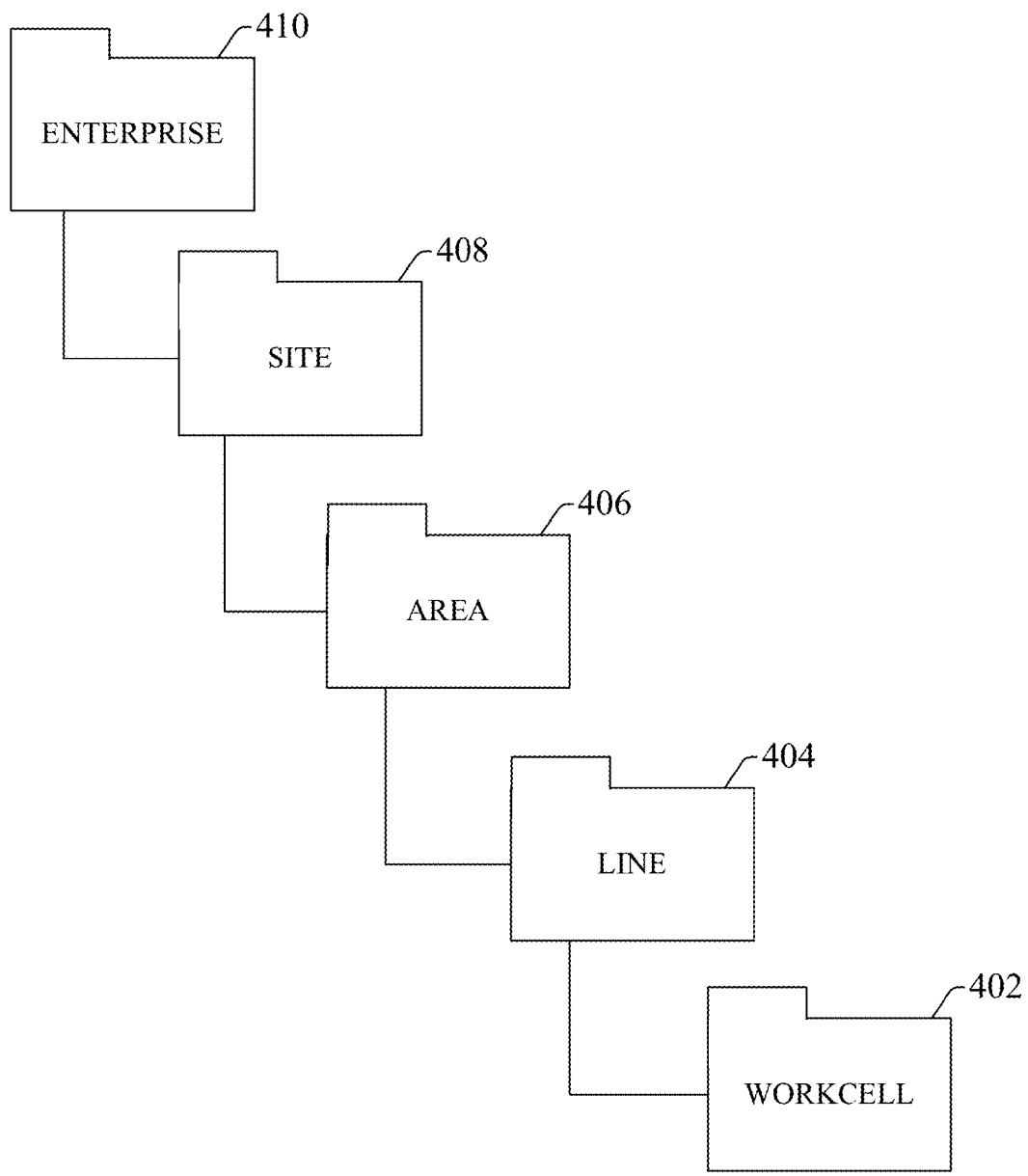
FIG. 4 illustrates an exemplary organizational hierarchy that can be used as a basis for a historian data model.

Turning briefly to FIG. 4, an exemplary organizational hierarchy that can be used as a basis for data model 310 is illustrated. In this exemplary organizational model, the hierarchical levels can include—from lowest to highest—a workcell level 402, a line level 404, an area level 406, a site level 408, and an enterprise level 410. The type instances described above—representing units of the enterprise—can be defined for respective levels of this hierarchical structure. In one or more embodiments, the historian data interface system described herein can provide a standard set of types that allow the user to model an industrial enterprise in terms of these standard types. The historian data interface system can also allow custom types to be created, allowing users to represent their particular business or manufacturing processes using a combination of standard and user-defined types.

Figure 5:
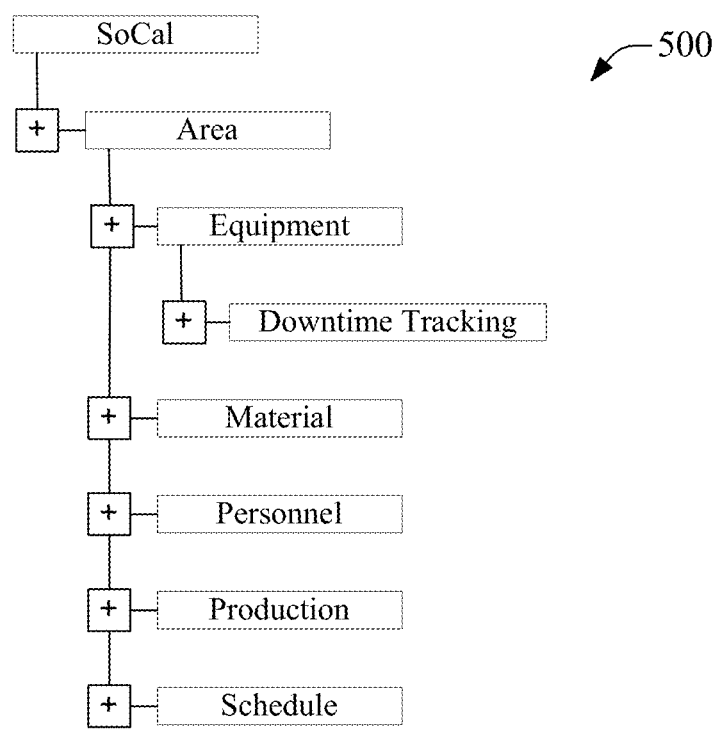
FIG. 5 is a block diagram of an exemplary historian data interface system configured to index and cache historian data.

Data model 310 allows devices of an automation system, their associated historians, and data items stored therein to be described and identified in terms of these hierarchical levels, allowing a common terminology to be used across the entire enterprise to identify devices and historian data associated with those devices. Thus, individual items of historian data (e.g., live analog and digital values stored in controller tags, archived data values stored in a historian register or other long-term data storage device, etc.), when integrated into framework 300, can be identified and viewed through interface component 306 by unique historian tags defined by data model 310. For example, through adherence to data model 310, a given item of data within the historian mesh network 312 can be identified with a historian tag or identifier that indicates the data item's origin or context within the organizational hierarchy (e.g., SoCal:DieCastArea:#1HeadlineMachine:DowntimeTracking:DowntimeMinutes). Data model 310 can represent industrial controllers, devices, machines, or processes as data structures (e.g., type instances) within this organizational hierarchy to provide context for data generated and stored throughout the enterprise relative to the enterprise as a whole. An exemplary portion of a browsable hierarchy 500 based enterprise units defined for data model 310 is illustrated in FIG. 5. Thus, data model 310 provides context enhancement that replaces the flat name structure that may be employed within the individual historians.

A given asset of an enterprise can be described in the data model in terms of a number of different type instances. Pursuant to an example, consider a pump in service as part of an industrial process. The pump can be associated with multiple different types of data, represented in the data model by respective type instances. For example, live data for the pump (e.g., pressure, flow, speed, etc.) is measured on a substantially real-time basis. Such data might be maintained in a data tag of an industrial controller or human-machine interface. Moreover, a maintenance management system may record performance or maintenance statistics for the pump, such as running hours, performance specifications, manufacturer data, available spares, or maintenance data. In addition, an enterprise resource planning (ERP) system or MES system may record quality assurance data for the pump, such as batch records, leak test data, lab sample results, etc. Historical data can also be archived for the pump by one or more historians. This can include, for example, volume of material pumped, product throughput, operation history, power consumed, etc. Furthermore, an asset database may record asset information for the pump (e.g., purchase data, cost, warranty, manufacturer, engineering specifications, related data, vibration data, etc.). Data model 310 can facilitate correlation of these various sources of disparate pump information.

Data model 310 can also provide for auto-discovery and creation of such structures. For example if a new device or historian is added to the system, historian data interface system 302 can automatically detect the new device and determine the device's context within the organizational hierarchy modeled by data model 310. Data model 310 can then reconfigure itself to incorporate the newly added device at the appropriate location within the organizational hierarchy, and historian data interface system 302 can automatically configure the new device or operation within mesh network 312. This can include identifying data tags available within the new device and establishing suitable correlations between these data tags and other historian tags already identified by the system.

Framework 300, under the guidance of historian data interface system 302, allows historians H1-HN to be tied to data model 310 and its associated addressing mode, enabling historian data to be automatically and efficiently exchanged between various layers of an organization, across organizational boundaries, or exchanged between lower level control entities to upper levels of the organization. In some embodiments, data model 310 can be distributed across control systems and other components of the organization (e.g., business computers) providing the historians with high level knowledge of overall system context and allowing the historians to automatically communicate with one another over the unified framework. Framework 300 can also include a directory and location service to enable configuration of historians H1-HN and to facilitate automated integration at various levels of the organization.

Data model 310 provides a unified view of data stored in distributed historians H1-HN, allowing a user to view and retrieve selected subsets of the historian data through interface component 306. For example, interface component 306 can be configured to receive a request for access to a particular subset of historian data stored among historians H1-HN, and present the results in a format selected by the user. To facilitate location of the subset of historian data requested by the user, access component 304 can leverage data model 310 to locate the desired historian data based on request criteria provided to interface component 306. In one or more embodiments, access component 304 can determine a most efficient or fastest path to the desired data based on the location of the data and the origin of the data request. In this manner, interface component 306, access component 304, and data model 310 can allow a user to access and retrieve data stored at one or more of the historians H1-HN regardless of where the data is stored, and without requiring user knowledge of the data's location.

To facilitate fast and efficient retrieval of data from the historian mesh network 312 from any location, historian data interface system 302 can include a migration component 308 configured to migrate data to different storage locations in accordance with one or more migration criteria. For example, a subset of historian data (e.g., data associated with a particular set of controller tags) may be initially located and stored at historian H4 of historian mesh network 312. However, based on such factors as a volume or frequency of requests for that subset of data, and/or the locations of origin of such requests, the migration component 308 may determine that relocating the subset of data to historian H1 will better position the data for faster and more efficient retrieval in response to future requests. Migration component 308 may base this decision on a determination that historian H1 is physically closer (relative to H4) to the location from which the majority of requests for the subset of data originate, or that historian H1 has improved storage or processing capability relative to historian H4, rendering H1 better able to service data retrieval requests more quickly than H4. Consequently, migrating the subset of data from H4 to H1 will allow the system to provide the data to the interface component 306 more quickly and with less processing overhead. This migration can be transparent to the end user by virtue of tag correlation features provided by historian data interface system 310. For example, when a user selects the migrated subset of data for retrieval by selecting the relevant data tags associated with historian H4 via interface component 306, data historian interface system 302 will be aware of the data's new location in historian H1, and retrieve the data from this new location.

In some embodiments, migration component 308 can learn patterns of requests for the subset of data, and dynamically migrate selected subsets of the data based on these learned request patterns. In an exemplary scenario, the migration component 308 may monitor access requests to a subset of data stored in historian H4, and learn that requests for the data originating from a particular user workstation or server on the enterprise level increase significantly between 2:30 and 3:00 (e.g., as a result of a daily report that executes during this time). Based on this determination, migration component 308 will move the requested data from historian H4 (which resides on the plant floor) to a historian residing on the enterprise level of the organization (e.g., historian H7 of FIG. 1) at 2:15, prior to the time when requests are expected to increase. In this way, when requests for the data from the enterprise level workstation increase as expected between 2:30 and 3:00, the data will located on a historian more readily accessible by the workstation. Migration component 308 can determine suitable destination historians for a migration operation based, at least in part, on reference to data model 310, which includes information on each historian H1-HN in the enterprise, including the respective historians' locations within the organization.

In some historian networks, there is a possibility that duplicate data will be collected and stored in multiple locations within the historian mesh network 312. For example, two or more industrial controllers may read measurements from a common telemetry device (e.g., a flow meter, a temperature or pressure sensor, a variable frequency drive, etc.) and store this data in respective associated historians, resulting in duplication of the meter data in multiple locations within the historian mesh network 312. Accordingly, in order to substantially optimize the storage space consumed by the stored data, migration component 308 can identify and delete redundant instances of the same data throughout the historian mesh network 312. Migration component 308 can also be configured to automatically delete data instances after a defined time period.

One or more embodiments of the migration component 308 can employ weighing algorithms in connection with deciding where and how long to store particular sets of data at particular locations, and at which locations within historian mesh network 312. For example, through interface component 306, a user can assign priority level to selected data tags within historians H1-HN. Migration component 308 can then apply different data maintenance routines to the various priority levels, based on different time-based weighting algorithms. For example, migration component 308 will allow a first set of historian data designated as having a high priority to be stored in the system for a longer duration prior to deletion than data sets assigned lower priorities. To this end, migration component 308 can apply a first weighing algorithm to the first set of historian data, such that the calculated value of the data decreases more slowly over time relative to a second weighing algorithm applied to a lower priority second set of historian data. In both cases, the migration component 308 will delete or migrate the sets of data when the respective weighing algorithms indicate that the calculated value of the data has fallen below a predefined setpoint as a function of time. The user can define (through interface component 306) whether the data sets will be deleted, or alternatively whether the data sets will be migrated to a different, long-term storage location having slower read/write access capability.

Weighted algorithms can also be maintained for historian data based on learned patterns of access to the data. For example, a weighted algorithm can provide a weighting to a particular data tag based on how often the data tag is being requested, from which level of the enterprise (e.g., machine level, plant level, site, level, enterprise level, etc.) the data tag is frequently requested. Based on this weighting, migration component 308 can determine where data associated with the data tag should be stored. This can include determining which level of the enterprise and which historian on that level (e.g., real-time data server with having fast accessibility versus remote long-term storage having slower retrieval times). The weighting algorithms can be re-assessed in substantially real-time as new information becomes available (e.g., additional access pattern data), so that migration component 308 an use the algorithms to move data between one storage to another as the assumed value of the data changes.

Migration component 308 can also be configured to perform data migrations from low level historians to higher level historians based on time spans. For example, in many scenarios, real-time data (that is, data having the smallest time span) is collected by machine-level data tags on the plant floor, such as those in an industrial controller or HMI. Machine-level historians may archive this real-time data from the controller tags to historian tags residing in the machine-level historians. This machine-level data can then be aggregated at a higher-level historian (e.g., a plant-level historian or enterprise-level historian) for long-term storage when the machine-level historian data reaches a define age. Accordingly, migration component 308 can be configured to monitor the age of historian data on the machine-level historian, and automatically migrate the historian data to the higher-level historian when the data reaches the predefined age (e.g., one week), and the data can be deleted from the machine-level historians. In this manner, the historian network maintains real-time data on the industrial controller, historian data having medium-term time spans on the machine-level historians, and historian data having long-time time spans on the higher-level historians. Subsequently, when specific data is requested from a client associated with historian data interface system 302, the main time span being sought can be specified in order to quickly identify the data source and level that contains the requested data.

One or more embodiments of historian data interface system 302 can also include a security component 314 that leverages data model 310 to control access to the pool of historian data stored in historians H1-HN. Security component 314 can deny, provide, or revoke access to the historians and/or their associated data. Security component 314 can also allow a user to define a scope of access to selected subsets of historian data via interface component 306. For example, through interface component 306, a system administrator can browse to respective historian or controller tags and individually assign access privileges to the tags. Security component 314 may also leverage native security mechanisms provided by an operating system on which historian data interface system 302 is running. For example, security component 314 may support group security, which allows a user or client application to be assigned to a group, where the group is associated with access privileges to specific files, data, or applications. Assignment to the group can also confer rights to invoke, install, or deregister a service. Thus, when a user or application attempts to access a subset of historian data, a group identity and/or other indicia associated with the user or application can be determined, and the security component 314 will grant suitable access privileges (e.g., read, write, execute . . . ) based on the identity. Examples of security technologies that can be employed in accordance with the subject disclosure include, but are not limited to, Internet Protocol Security (IPsec), Secure Sockets Layer (SSL), Simple Authentication and Security Layer (SASL), Kerberos, Lightweight Directory Access Protocol (LDAP), NT LAN Manager (NTLM), Active Directory or other authentication mechanisms. Furthermore, security component 314 can protect and/or format instructions conveyed to, stored in, or obtained from the framework 300. For example, such instructions can be encrypted, digitally signed, encoded, compressed, password protected, etc. Moreover, tying historians H1-HN to the data model allows the historians to be automatically integrated under a unified security scheme. This unified security scheme allows security changes to be propagated to the historians from other components of the system.

Historian data interface system 302 provides a unified mechanism for configuring historians in the mesh network 312 for collection of desired data. By unifying the historians H1-HN under a common interface that adheres to data model 310, historian data interface system 302 can allow users to mark selected items of control data to be collected for historian purposes. For example, interface component 306 can present a browsable hierarchical view of controller tags distributed throughout the enterprise (e.g., controller tags located within industrial controllers $112_{1-N}$ of FIG. 1), where the controller tags represent data items being monitored or generated by the respective controllers (e.g., a meter value, a machine state, a production count, etc.). The hierarchical view of the controller tags can accord to data model 310, which defines the hierarchical levels of the organization and the units comprising each level. A user can interact with this unified presentation to browse controller tags and mark selected tags for collection by one or more historians H1-HN. Historian data interface system 302 will propagate this configuration information to the appropriate historian(s), instructing the historians to record the marked data. Interface component 306 can also allow selected data items (e.g., data tags) to be configured for publish and subscribe functionality, whereby selected data is recorded in response to a change in data structure, or when the data achieves a defined state, rather than being recorded continuously.

By integrating the historians H1-HN under common data model 310, historian data interface system 302 can allow a user to configure components of an organization to collaborate to execute an overall scheme for historical data collection. For example, PLCs residing on a middle control level of the organization (e.g., controllers $112_{1-N}$ of FIG. 1) and sensor components on a lower control and sensing level can be configured via interface component 306 to share data collecting responsibilities, or to provide collected data to higher levels of the organization (e.g., devices on the enterprise level). In an exemplary scenario, lower level collection components can include rack-mounted historians which operate in an industrial controller rack and communicate to other modules in the rack over the controller's backplane. These rack-mounted historians can collect data from the backplane and share the data across local networks. The historians can also share the data with remote systems, such as a remote web browser operating one or more web pages. Such web pages or other remote interfaces can also be employed to configure historian functionality across local and/or remote networks (e.g., if historian data interface system 302 resides on a web server accessible by the remote or web-based interfaces).

Moreover, data model 310 provides the historian data interface system 302 with a global, enterprise-wide view of the data collection process, allowing the system to dynamically modify a current data collection scheme in response to changing conditions. For example, interface system 302 can monitor data collection processes carried out by historians H1-HN on a real-time basis, and may determine that a device or level has become over-burdened with the data collection process. In response to this determination, interface system 302 can instruct the relevant historians to shift data collection responsibility from the over-burdened device or level to another device or level with sufficient storage and processing resources to take on the additional data collection load, thereby employing system-wide resources more effectively. Historian data interface system 302 can determine a suitable historian to take on the new data collection task based in part on the data to be collected, the locations of the respective historians relative to the data being collected (as determined by data model 310), and the current data collection load seen by the respective historians.

To facilitate one or more of the historian data management features discussed above, historian data interface system 302 and its backbone can monitor and track locations of respective items of historian data. For example, historian data interface system 302 can implement, as part of framework 300, a crawler that crawls the various historians comprising historian mesh network 312 to identify historian data items, their respective locations and data types, and correlations between historian tags. The crawler can identify, for example, correlations between historian tags and their associated real-time tags within the control system (e.g., on an industrial controller). The crawler can index this information—including tag correlation information—in a continuously updating tag dictionary in local cache memory to facilitate fast identification of an appropriate source for requested data. Historian data interface system 302 can employ references or pointers to facilitate storage and retrieval of the historian data, and data model 310 can expose historian tags to provide for locating data across the historian mesh network 312 or other storage devices.

Figure 6:
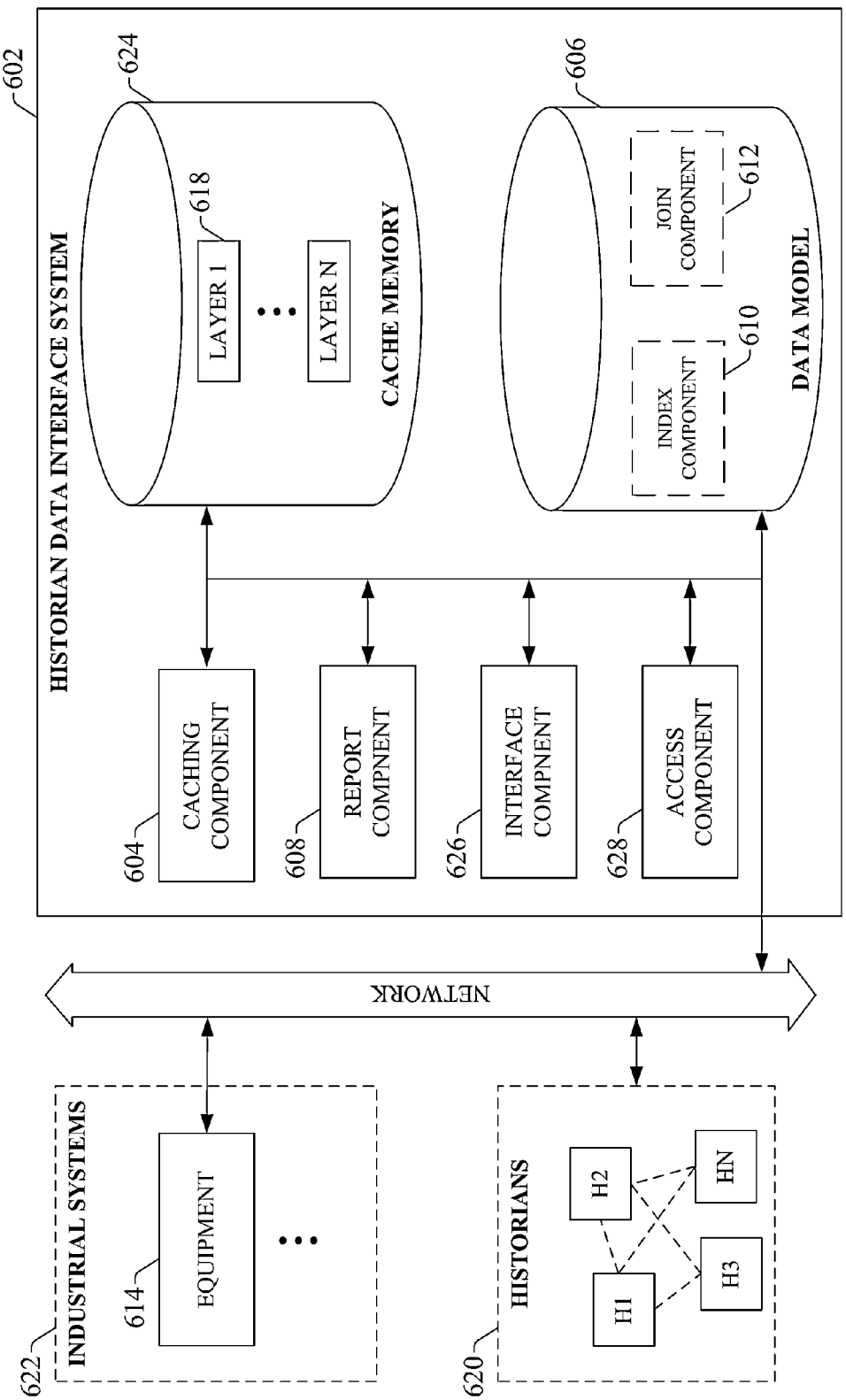
FIG. 6 illustrates an exemplary historian data interface system configured to index and cache historian data

FIG. 6 illustrates an exemplary historian data interface system configured to index and cache historian data. Historian data interface system 602 includes a data model 506 (similar to data model 310 of FIG. 3) and a caching component 604. In the present example, data model 606 includes an index component 610 and a join component 612. Index component 610 is configured to index information relating to historians 620 and their associated historian data, as well as equipment 614 comprising one or more industrial automation systems 622 of an enterprise. Historian data interface system 602 can employ any suitable mechanism to gather information about the historians and their available data. For example, historian data interface system 602 can implement a crawler (as described above) that crawls the network of historians 620 to identify historians H1-HN, their available data items, their respective locations, data types of the respective data items, correlations between data tags (e.g., between duplicate data tags, or between live data tags and their corresponding historian tags), and other such information. Index component can index information gathered by the crawler in local cache memory 624 (e.g., in a continuously updating tag dictionary). Interface component 626 (similar to interface components 204 and 306 of FIGS. 2 and 3, respectively) can leverage this indexed information in connection with servicing received requests for historian data. Interface component 626 can also use this indexed information to render browsable views of the data distributed across the network of historians 620.

Join component 612 is configured to perform data joins between historian data items in connection with retrieving and provisioning of requested historian data, as well as in connection with migration, storage, caching and the like. In particular, join component 612 can leverage data model 606 to determine relationships between historian data items, and establish database joins between selected data items based on these determined relationships. For example, based on the organizational hierarchy encoded in data model 606, join component 612 may determine that a motor speed value located in a first historian (e.g., H2) is associated with an industrial stamping press whose current or historical status is located in a second historian (e.g., H4). Based on this determination, join component 612 can create a data join between the historian tag for motor speed value located in historian H2 and the historian tag for, e.g., the operating mode of the press (or other relevant data item associated with the press) located in historian H4. Join component 612 can create a record of this join in cache memory 624. Thereafter, in response to a request received at interface component 626 for data relating to the stamping press, historian data interface system can quickly retrieve the relevant data based in part on the data joins created by join component 612, and render the data in a selected viewing format via interface component 626.

One or more embodiments of the framework described herein can also selectively cache historian data to local storage to facilitate high-speed service of data requests. For example, based on a determination of relative importance of sets of data in the historian network (e.g., assigned priority or observed number of accesses), historian data interface system 602 can migrate selected sets of data to cache memory 624 so that data with relatively high importance can be delivered more quickly and efficiently in response to a retrieval request. Accordingly, caching component 604 can selectively store selected historian data to facilitate servicing high-speed requests for the data. Decisions regarding whether a certain set of data is to be cached can be based on an explicit priority value designated to the respective historian tags. For example, a user can browse the set of historian tags associated with historians 620 via interface component 626, and flag selected historian tags as having high priority. Alternatively or in addition, historian data interface system 602 can infer relative priorities for the historian tags based on learned patterns of access to the respective historian tags, as described above in connection with migration component 308 (see FIG. 3). For example, migration component 308 can monitor access requests for respective items of historian data, and learn that a particular subset of data items is requested at a frequency that exceeds a defined frequency setpoint. Accordingly, historian data interface system 602 will flag the historian tags associated with the identified data item as having a high priority. Bused an these priority designations, caching component 604 will cache the flagged historian data to cache memory 624 to facilitate faster retrieval of the data in response to requests received by interface component 626.

In one or more embodiments, caching component 604 can cache the data items according to a desired degree of priority granularity. That is, historian data interface system 602 can support multiple importance levels (e.g., high importance, moderate importance, low importance, etc.), such that the historian tags can be categorized under one of the multiple importance levels. To ensure that cached data is made available at a speed commensurate with the data's importance, caching component 604 can cache the historian data such that respective data items are assigned to one of multiple cache layers 618, where each of the cache layers 618 corresponds to an importance level. Each of the cache layers 618 can be weighted as a function of access speed required. For example, caching component 604 will cache historian data flagged as having the highest level of importance at a layer that affords the fastest access speed, while lower priority data is cached at layers offering lower access speeds. By caching historian data according to these granular layers, historian data interface system 602 can more efficiently utilize processing resources by allotting such resources among different cached data sets in accordance with the relative importance of the data sets.

The cache layers 618 can also provide for progressive JPG-like provisioning of historian data representations, such that a coarse representation (represented by the highest-speed layer) can initially be provided quickly in order to provide context for a selected set of historian data, and progressively finer granularity of detail can be provided as the lower layers are subsequently provided to present a more comprehensive view and understanding of the historian data. For example, a user may request to view a graphical representation of a set of historian data points for a selected time interval. The graphical representation may be a line graph that trends the set of historian data points, although other types of graphical representations are also possible and within the scope of the present disclosure. When the graphical representation is requested, the subset of historian data values cached at the layer having the fastest access speed (which may correspond to data points having the highest importance) will be retrieved first and represented on the trend, providing an initial view of the trend made up of the most important data points. As time progresses, historian data values from the other cache layers—having progressively slower access speeds—will be retrieved and incorporated into the trend at speeds commensurate with the access speeds of the respective cache layers, causing the trend to become progressively more detailed as time passes.

Through automatic migration of historian data, together with automatic data tag correlation and tracking offered by the historian data interface system 602, historical data storage can be substantially optimized in a dynamic manner without the need to update automated reports that leverage this data to make the reports aware of new locations of the data. For example, a report that generates automatically and the end of a shift may be configured to retrieved data from a particular historian tag for inclusion in the report. Conventionally, such reports are preconfigured to point to the historian tag, with the expectation that the data will be available from that specific tag. However, the automatic migration and correlation features of historian data interface system 602 can facilitate migration of such historian data to sources that afford faster access to the data, while automatically correlating the original historian tag with the new source. Accordingly, the automated report can continue to request data from the original historian tag, and historian data interface system will automatically retrieve the data from the new source based on the tag correlation.

Figure 7:
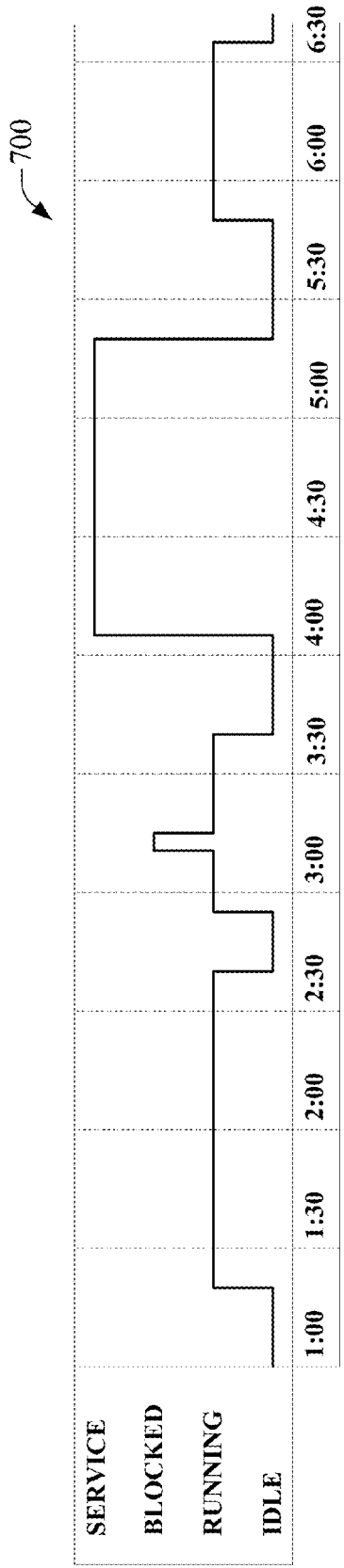
FIG. 7 illustrates an exemplary graph of a machine's operating states as a function of time.
Figure 8:
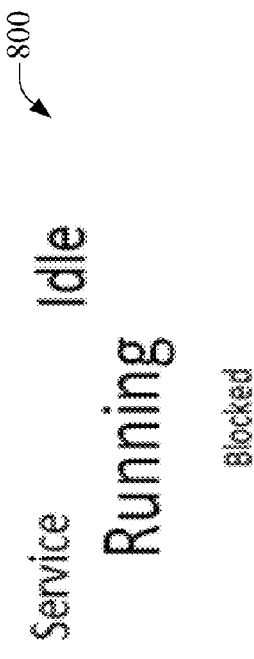
FIG. 8 illustrates an exemplary tag cloud visualization of retrieved historian data.

Historian data interface system 602 can also include a report component 608 configured to generate reports that leverage the historian data (that is, historian data cached in cache memory 624 and/or non-cached historian data residing exclusively on the network of historians 620). These reports can include, but are not limited to, daily production summaries, event or alarm logs, graphical trends, charts, and the like. FIGS. 7 and 8 depict two exemplary graphical views of historian data that can be rendered by report component 608 (e.g., via interface component 626). FIG. 7 illustrates an exemplary graph 700 of a machine's operating state as a function of time. Report component 608 can generate this graph 700 in response to request input received at the interface component 626. This request input can include, for example, identification of a machine, selection of a type of data requested (e.g., machine status), a selection of a report type (e.g., time graph), and a range of times for which the report is to be generated. In response to this input, access component 628 (similar to access component 304) will access data model 606 and/or index information stored in cache memory 624 (by index component 610) in order to determine which subset of historian tags contain operating mode data for the selected machine, as well as the location(s) of historian data associated with the identified historian tags. Access component 628 can also determine a most efficient or fastest path to the identified historian data from the origin of the report request. If the one of the identified historian data items resides at multiple locations within the network of historians 620, access component 628 will determine the location nearest to the origin of the report request and retrieve the duplicated data item from the selected location. If one or more of the identified data items have been cached in cache memory 624 (as described above), access component 628 will retrieve those data items from their respective cache layers 618 in cache memory 624.

Once access component 628 has retrieved the desired historian data from their respective locations, report component 608 will leverage the data to generate graph 700, which plots the operating mode of the machine (either "Idle," "Running," "Blocked," or "Service") over the requested time range. Report component 608 can also support visualization of the retrieved historian data as a tag cloud 800, as illustrated in FIG. 8. For example, analysis of the retrieved historian data may determine that, from 1:00 to 7:00, the machine experienced four operating statuses—"Idle," "Running," "Blocked," and "Service." In particular, the historian data may indicate that "Idle" took up 115 minutes, "Running" took up 178 minutes, "Blocked" took up 2 minutes, and "Service" took up 65 minutes. As illustrated on graph 700, these statuses may not necessarily be continuous. Rather, for the time period of interest, some machine statuses may have occurred multiple times during the time period (e.g., during the time period of interest, there were four "Running" durations, five "Idle" durations, one "blocked" duration, and one "service" duration). Report component 608 can determine the total amount of time the machine spent in each status based on these individual duration times.

Based on this information, report component 608 will generate tag cloud 800, which depicts the operating modes in the form of strings having font sizes that are a function of the relative amounts of time that the machine was in the respective modes for the selected time period. In the present example, tag cloud 800 illustrates that the machine was in "Running" mode for the greatest percentage of the time period, followed in descending order by "Idle" mode, "Service" mode, and "Blocked" mode. In this way, tag cloud 800 offers an overview of the machine's health that can quickly convey to an operator where attention should be focused. Interface component 626 can allow the user to switch between these two views (time graph 700 and tag cloud 800) as desired. Although the exemplary tag cloud 800 distinguishes the relative durations of the machine statuses according to font size, report component 608 can also use other string characteristics to convey the relative status durations (e.g., font color). Moreover, depending on the data being viewed, report component 608 can generate tag clouds that convey other types of information, such as relative production counts of different machines for a given shift or other such information.

Figure 9:
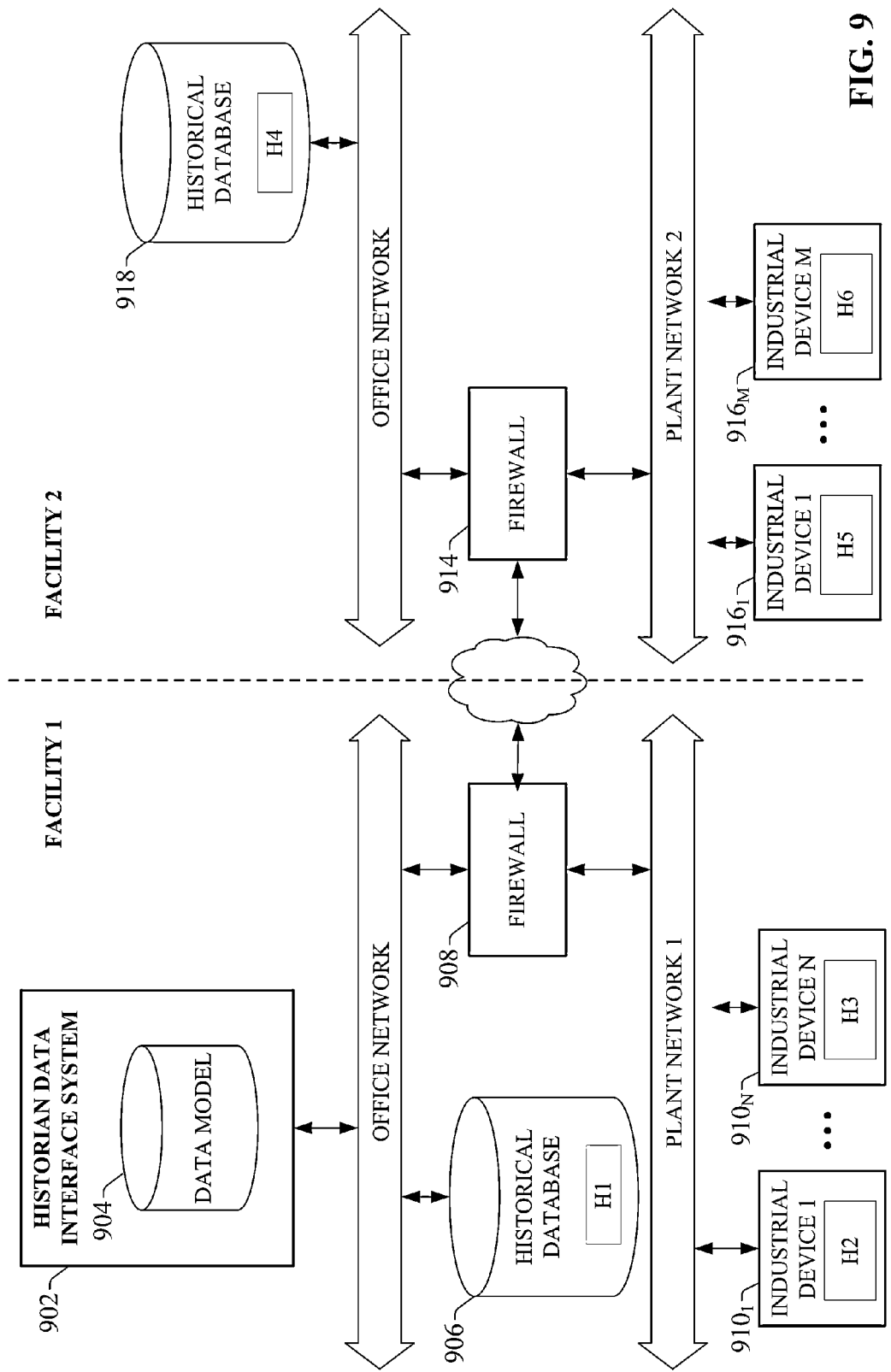
FIG. 9 illustrates an exemplary architecture including a historian data interface system that provides a common interface for historian data located across two facilities of an enterprise at two different locations.

It is to be appreciated that the historian data interface system described herein not limited to historian data management within a single plant facility. Rather, embodiments described herein can provide a framework that unifies and correlates historian data tags across multiple facilities of an enterprise, and provides a common interface for configuring data collection and viewing historian data distributed across the multiple facilities. FIG. 9 illustrates an exemplary architecture in which historian data interface system 902 provides a common interface with which to configure, manage, and view historian data across two facilities of an enterprise at two different locations. Similar to previous examples, historian data interface system 902 utilizes a data model 904 (similar to data models 218, 310, or 606) to provide unified access to historian data stored in a plurality of data historians distributed across multiple levels of the enterprise. In the present example, historian data interface system 902 is located at a first facility (Facility 1) of an enterprise. Similar to enterprise 100 of FIG. 1, Facility 1 comprises multiple levels, including a control (or micro) level on which industrial devices $910_{1-N}$ reside. Industrial devices $910_{1-N}$ may have associated therewith respective historians (H2 and H3). Facility 1 also includes a historical database 906 residing on a higher level than the control level (e.g., a plant level), which comprises another data historian (H1).

Facility 2 is a second plant facility of the enterprise at remote location relative to Facility 1, and also includes one or more industrial devices $916_{1-M}$ on a control level and a historical database 918 on a plant level, where industrial devices $916_{1-M}$ and historical database 918 have associated therewith respective historians H4-H6. Facilities 1 and 2 are communicatively connected over an external network, such as the Internet, through firewalls 908 and 914.

Historian data interface system 902 is capable of collectively managing and viewing the multiple historians distributed across the multiple levels and the multiple plant facilities by treating the historians at both locations as a collective mesh network (similar to the mesh network 312 in FIG. 3). To this end, data model 904 can model the multiple-level, multiple-facility enterprise accordingly.

Figure 10:
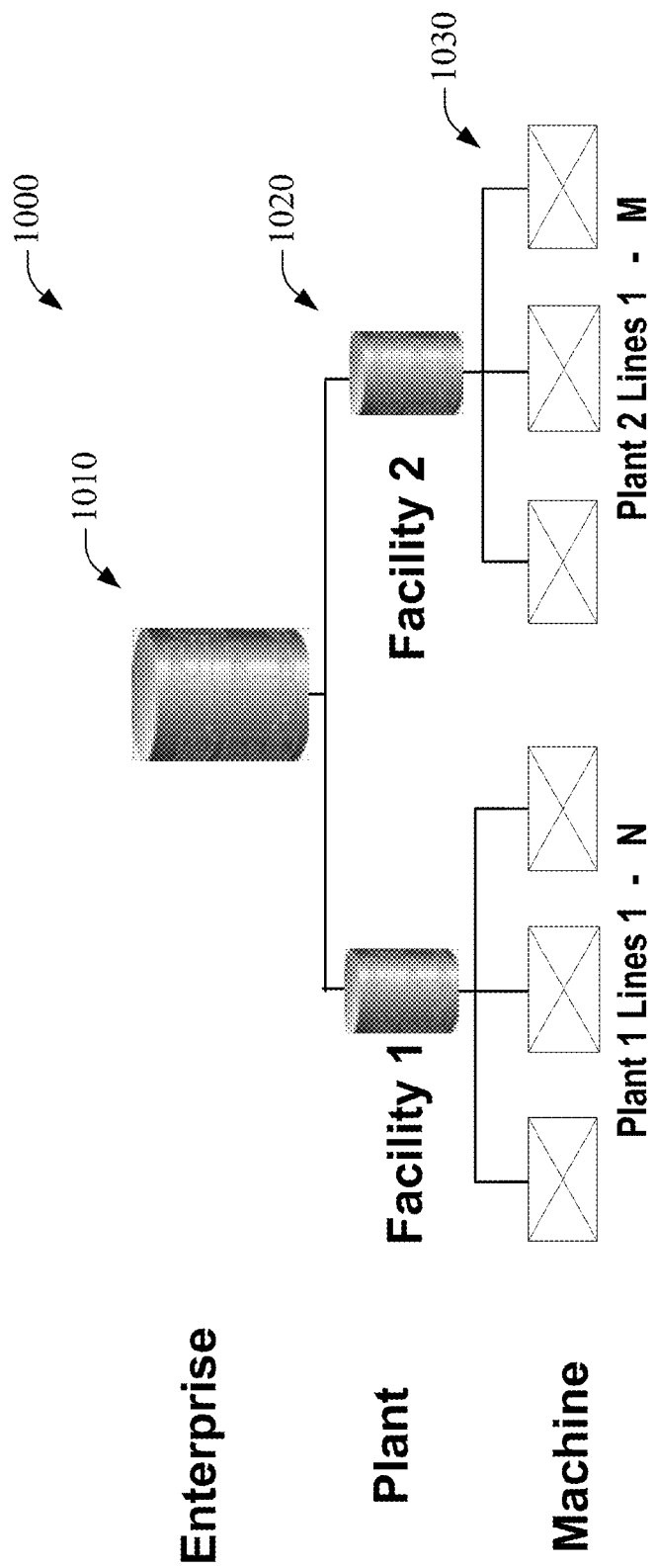
FIG. 10 illustrates an exemplary generalized architecture that can serve as a basis for a historian data model.

FIG. 10 illustrates an exemplary data model architecture 1000 represented by data model 904. At 1010, the highest data collection level is referred to as the enterprise level. In some scenarios, this level aggregates data collected from lower level levels such as from a plant level 1020 (representing Facilities 1 and 2) and a machine or control level 1030 (representing industrial devices $910_{1-N}$ and $916_{1-M}$). Although data model architecture 1000 includes three example levels of a historian system, it is to be appreciated that more or less than three levels can be configured in data model 904. For example, any of the levels depicted in FIG. 10 can be further granulated to include additional levels (e.g., one or more levels depicted in FIG. 4). By leveraging data model 904 to perform the historian data management functions described above in connection with FIGS. 2-8, historian data interface system 902 allows distributed historians at both facilities to be viewed as a unified historian network that spans machines, plants, and enterprises.

Figure 11:
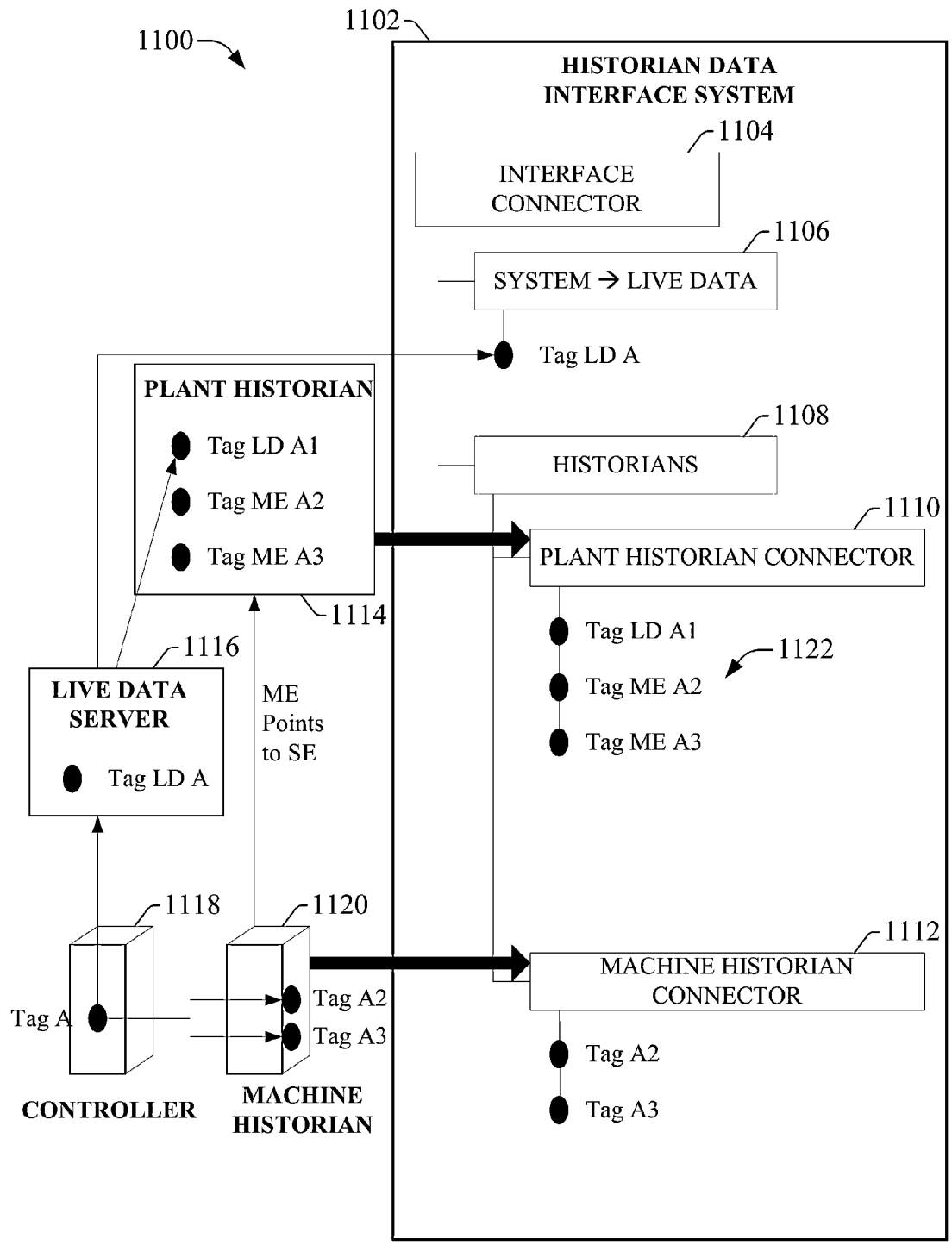
FIG. 11 illustrates an exemplary historian data interface system for correlating, managing, and viewing historian data distributed across multiple components of an industrial system.

Turning now to FIG. 11, various historian data management functions are described in connection with an example system 1100. In the present example, historian data interface system 1102 is used to manage and view data distributed across multiple components of an industrial system. The industrial system includes a controller 1118 having a data tag (Tag A), which represents a real-time data value (e.g., a temperature value, a production count, a machine status, etc.) measured or generated by controller 1118 in connection with monitoring or controlling an industrial process. A live data server 1116 (residing on the plant floor or on the business level of the enterprise) monitors Tag A in controller 1118, reading the live value of Tag A into a data tag of its own (Tag LD A). A machine historian 1120 located on the plant floor and associated with the machine level of the enterprise (e.g., machine level 1030 of FIG. 10) captures time-series historical data relating to a particular machine comprising the industrial process. Accordingly, machine historian 1120 also monitors Tag A in controller 1118 and stores time-varying values of Tag A in a series of historical tags (for simplicity, only two such time-series tags—Tag A2 and Tag A3—are depicted in machine historian 1120). In addition, a plant historian 1114 residing on a level higher than the control level (e.g., plant level 1020 of FIG. 10) aggregates selected sets of data from the plant floor for historical collection. To this end, plant historian 1114 monitors the live data tag Tag LD A in live data server 1116 and stores historical values of the live data (e.g., in Tag LD A1). Plant historian also monitors Tags A2 and A3 in machine historian 1120 and duplicates the values in its own historical tags (e.g., Tag ME A2 and Tag ME A3). As a result of this configuration, live data server 1116, machine historian 1120, and plant historian 1114 represent three different historians having respective data tags, some containing duplicate data (e.g., Tag ME A2 and Tag A2) and some containing respective real-time and historical versions of the same data (e.g., Tag LD A and Tag LD A1).

Historian data interface system 1102 (similar to historian data interface systems 202, 302, 602, or 902) can correlate these distributed data tags such that, when a subset of the data stored in the data tags is requested, historian data interface system 1102 makes a determination regarding the best source of the requested data. Historian data interface system 1102 can make such transactions substantially transparent to the user, allowing the user to access desired data from a single reference point. Accordingly, historian data interface system 1102 correlates Tag A2 and Tag ME A2 as having the same historical data, and likewise correlates Tag A3 and Tag ME A3. Historian data interface system also correlates Tag LD A and Tag LD A1 as being, respectively, live and historical versions of Tag A in controller 1118.

FIG. 11 illustrates an exemplary hierarchical view of the historian data tags provided by historian data interface system 1102 (e.g., by interface component 204). Under an interface connector node 1104, which represents a highest node in the hierarchy, historian data interface system 1102 categorizes the data tags under either a live data node 1106 or a historian node 1108. Live data node 1106 displays data tags associated with one or more live data servers on the industrial system (e.g., live data server 1116), while historian node 1108 displays tags associated with one or more historians (e.g., machine historian 1120 and plant historian 1114). As illustrated in FIG. 11, historian node 1108 includes two lower nodes—a plant historian node 1110 corresponding to plant historian 1114, and a machine historian node 1112 corresponding to machine historian 1120. Expanding nodes 1106, 1110, or 1112 displays the data tags associated with the selected node.

In the present example, Tag ME A2 on plant historian 1114 represents the same data as Tag A2 on machine historian 1120. Accordingly, historian data interface system 1102 will automatically correlate these two data tags. Consequently, when a user at historian data interface system selects the historian tag 1122 representing Tag ME A2, historian data interface system 1102 (e.g., using access component 206) will determine which source of the data (Tag ME A2 at plant historian 1114 or Tag A2 at machine historian 1120) is capable of providing the requested data item more quickly, based on such considerations as the physical locations of the data sources relative to historian data interface system 1102, processing load currently seen by the respective data sources, hardware specifications of the respective data sources, etc. Thus, when data items are historized in multiple historians, historian data interface system 1102 determines the best source of the data items in response to requests for the data.

Historian data interface system 1102 can leverage tag correlation in a number of ways to improve efficiency and speed of historian data presentation. For example, if a user of historian data interface system 1102 selects a historian tag from the tag hierarchy for inclusion in a graphical trend, and the selected data is available in an alternate tag on a higher-speed historian elsewhere on the historian network (or in cache memory 624 if the selected data has been previously cached), historian data interface system 1102 may select the alternate tag as the source of the data for trending purposes. In another example, if a selected historian tag has been added to a live data trend, and the historian tag or its associated historian becomes unavailable, historian data interface system 1102 can locate another source for the data based on previously determined historian tag correlations. In yet another exemplary scenario, if a user-created data trend is trending data from a selected historian tag, and historian data interface system 1102 determines that another historian tag having a newer version of the selected data becomes available, historian data interface system 1102 may automatically replace the source of the data trend from the previously selected historian tag to the newly available data tag.

Historian data interface system 1102 can also facilitate automated data aggregation. For example, in response to a request for an aggregated set of historian data (such as when a report is being generated requiring data from multiple historians), historian data interface system 1102 can make a determination that such requests may be handled faster and more efficient by a particular historian. Accordingly, historian data interface system 1102 will automatically forward such requests to the identified historian for processing. This can reduce calculation loads on an interface server, allowing for processing of aggregations at a server determined to provide the best performance.

Historian data interface system 1102 can also facilitate role-based access to the data available in the various distributed historians. For example, a user with administrator rights can use historian data interface system 1102 to associated respective historians, groups of historians, or data tags with a particular level of access privilege, and associate users with respective access levels. These access levels can be based on a user's role in the enterprise (e.g., operator, plant manager, accounting, etc.). Users accessing the historian network through their own client interfaces will then be afforded access to the historians and associated data according to their role and the access privileges defined for their respective access level. The access levels can define, for example, which data sets a user is allowed to view (e.g., data sets associated with a particular production area), whether the user is granted write privileges to the data (e.g., in order that incorrect historian values can be re-written with correct values), etc. Thus, users at all levels of the enterprise can view historian data located throughout the enterprise hierarchy according to their respective roles.

In order to provide for or aid in the numerous determinations or inferences described herein (e.g. inferring best historian data or historian tags to access), components of the framework can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIG. 12 illustrates an exemplary screen provided by one or more embodiments of the historian data interface system for configuring trend charts. Exemplary interface screen 1200 includes a first section 1202 for selecting data points to be included on a trend. Search field for point name, point source, and point type can be used as search criteria for locating desired data points among the network of historians. Based on the entered search criteria, historian data interface system will display a list of available data points (historian tags) matching the criteria in display section 1206. The historian data interface system can construct the list of matching data points based on a search of indexed information in cache memory (e.g., cache memory 624), by referencing the data model (e.g., data model 606), by polling the historians for their available data tags, or other suitable techniques. Users can then add desired points to the trend chart by selecting the desired points in the "select" column. In one or more embodiments, historian data interface system may also allow users to browse to desired data tags by interacting with the hierarchical data tag interface illustrated in FIG. 11, and add selected data tags to a trend by dragging historian tags from the hierarchy and onto the trend (or by flagging the data tag to be trended within the hierarchical representation). In either case, when a data tag has been selected for trending, historian data interface system will select a best source for the selected data value, which may or may not be the particular historian tag selected by the user. For example, if the user selects Tag A2 of FIG. 11 for trending, historian data interface system may determine that Tag ME A2 (located on plant historian 1114) would provide the same data more quickly than Tag A2 on machine historian 1120. Historian data interface system may also change the source of a data point during trending if a current source of data unexpectedly becomes unavailable, or if a faster source of the data becomes available.

In addition, a user can interact with the graphical trend to overlay additional related information, and historian data interface system can leverage the predetermined historian tag correlations to facilitate location and display of the additional data. For example, while a data point is being trended, a requester can click a button on the trend to overlay alarm information. In response, historian data interface system will determine the relevant historians and historian tags based on the historian tag correlations, and retrieve relevant alarms for the specified time span and tags being displayed.

Figure 13:
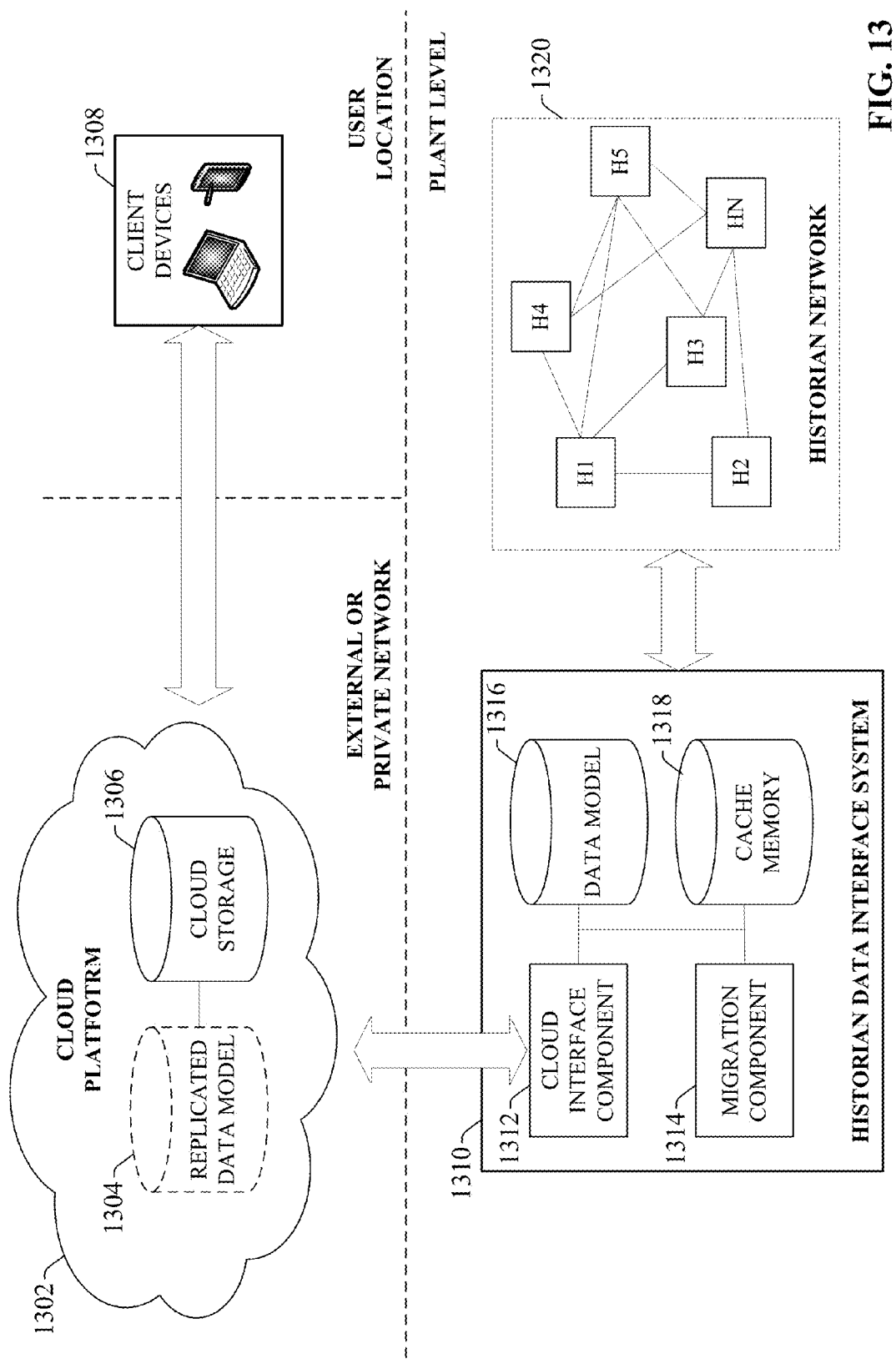
FIG. 13 illustrates an exemplary architecture that leverages a cloud platform in connection with storage, management, and provision of historian data.

One or more embodiments of the historian data interface system described herein can also include features that facilitate migration of historian data to a cloud platform. FIG. 13 illustrates an exemplary architecture that leverages a cloud platform in connection with storage, management, and provision of historian data. As described in previous examples, historian data interface system 1310 can include a data model 1316 (similar to data models 218, 310, 606, and 904) that facilitates configuration and management of historian network 1320. Historian network 1320 comprises a plurality of data historians distributed across multiple levels of an enterprise and/or across multiple plant facilities of the enterprise. Historian data interface system 1310 also includes cache memory 1318 (similar to cache memory 624 of FIG. 6) which contains indexed information regarding locations, content, and relationships of the various data tags located throughout historian network 1320. Cache memory 1318 (or another memory associated with historian data interface system 1310) can also have stored thereon cached values of selected subsets of historian data that have been flagged as having particular importance, so that the cached values can be retrieved more quickly in response to a request for the data.

In the present example, historian data interface system 1310 also includes a cloud interface component 1312, which can facilitate migration of historian information to a cloud platform 1302. Historian information that can be migrated to cloud platform 1302 includes historian tag data, historian configuration information, data model 1316, or other historian information. Cloud platform 1302 can be any infrastructure that allows cloud-based storage and/or computing services to be accessed and utilized by cloud-capable devices. Cloud platform 1302 can be a public cloud accessible via the Internet by devices having Internet connectivity and appropriate authorizations to access the cloud platform 1302. In some scenarios, cloud platform 1302 can be provided by a cloud provider as a platform-as-a-service (PaaS), allowing a subscriber to utilize cloud storage and processing resources as desired. Alternatively, cloud platform 1302 can be a private cloud operated internally by the enterprise. An exemplary private cloud can comprise a set of servers hosting the cloud storage and processing resources and residing on a corporate network protected by a firewall.

Providing historian data interface system 1310 with cloud capability can provide a number of advantages particular to industrial automation. For one, cloud-based storage offered by cloud platform 1302 can be easily scaled to accommodate the large quantities of data generated daily by an industrial enterprise. Moreover, multiple industrial facilities at different geographical locations can migrate their respective historian data to the cloud for aggregation, collation, collective analysis, and enterprise-level reporting without the need to establish a private network between the facilities. In another exemplary application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications.

Migration component 1314 can be configured to migrate or replicate selected sets of historian data to cloud storage 1306 on cloud platform 1302. This can include replicating contents of cache memory 1318 to cloud storage 1306, migrating or replicating contents of selected historian tags distributed across historian network 1320, etc. Migration component 1314 can be configured to perform these migrations periodically (e.g., daily, weekly etc.) or on-demand. Migration component 1314 can also replicate data model 1316 to the cloud platform to yield a replicated data model 1304, which can be leveraged by a cloud-based historian data interface system for remote access and management of historian network 1320 (to be described in more detail below). In this way, a local set of historians and historian data can be virtualized on a cloud-based framework, providing a reliable backup of the historian data and configurations, as well as making the historian data available for remote access via the cloud platform 1302.

Historian data that has been replicated or migrated to cloud storage 1306 can be accessed remotely by cloud-capable client devices 1308, such as mobile phones, tablet computers, desktop computers, or other suitable devices. Replicated data model 1304 can allow the data to be viewed on client devices 1308 in the context of the overall enterprise hierarchy.

Figure 14:
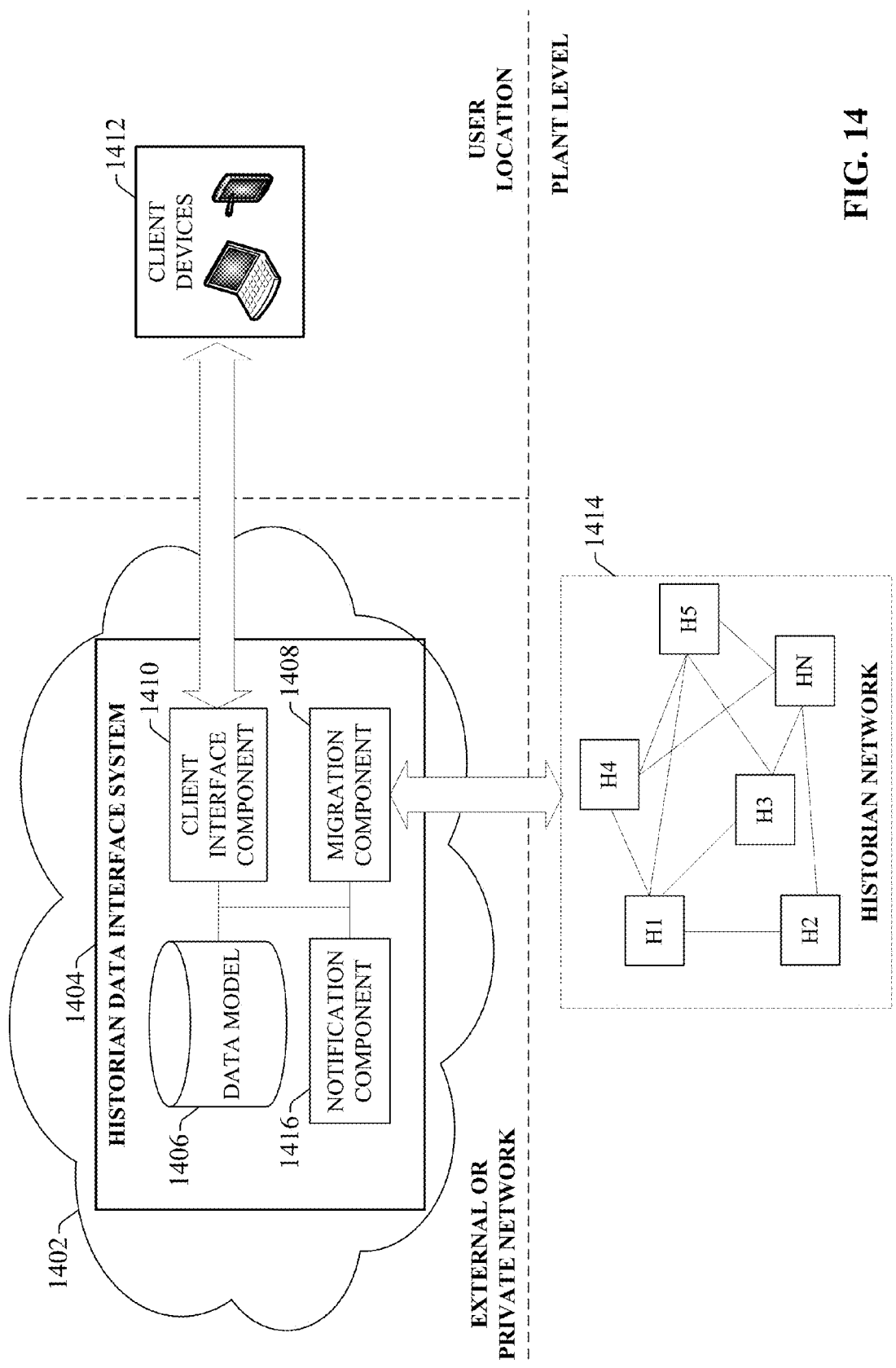
FIG. 14 illustrates an exemplary cloud-based historian system architecture.

Also, one or more embodiments of the historian data interface system described herein can be embodied as a cloud-based historian system. FIG. 14 illustrates an exemplary architecture for such a cloud-based historian system. In this example, historian data interface system 1404 resides and executes on cloud platform 1302 as a cloud-based service. In some scenarios, access to cloud platform 1402 and historian data interface system 1404 can be provided to customers as a subscription service. Alternatively, historian data interface system 1404 can be owned and maintained by the end user, and executed on a cloud platform belonging to or provisioned to the user. If cloud platform 1402 is a web-based cloud, devices on the plant level, such as historians H1-HN comprising historian network 1414, may interact with the historian data interface system 1404 directly or via the Internet. In an exemplary configuration, historians H1-HN may interact with historian data interface system 1404 through a cloud gateway device (not shown), where the historians H1-HN connect to the cloud gateway through a physical or wireless local area network or radio link. In another exemplary configuration, historians H1-HN may access the cloud platform 1402 directly using respective integrated cloud interfaces.

Cloud-based historian data interface system 1404 includes a data model 1406 (similar to data models 218, 310, 606, 904, or 1316), and can perform any of the configuration, management, viewing, and reporting functions described above, but does so remotely from cloud platform 1402. For example, historian data interface system 1404 can provide a common historian interface to client devices 1412 having Internet capability and suitable access privileges. Accordingly, historian data interface system 1404 includes a client interface component 1410 configured to receive data retrieval requests from client devices 1412, and to render selected subsets of historian data to the client devices 1412 in response to the requests. Through client interface component 1410, historian data interface system 1404 can deliver any preconfigured interface screens to the client devices 1412 (such as the interfaces depicted in FIGS. 11 and 12) and allow the user to remotely request and view historian data stored in historians H1-HN through interaction with these screens. Historian data interface system 1404 can also facilitate remote configuration of historians H1-HN via cloud platform 1402.

Since historian data can be served to diverse types of client devices (e.g., desktop computers, mobile phones, tablet computers, laptop computers, HMI terminals, television monitors, etc.), client interface component 1410 can render a given display screen in a format suitable for display on the client device invoking the screen, and in a manner that makes efficient use of the device's resources. For example, if client interface component 1410 receives a request for a historian display screen from a cellular phone, the client interface component 1410 can deliver the requested display screen to the cellular phone in a format adapted to the display capabilities of the phone (e.g., at a display ratio and resolution suitable for display on the phone's screen).

In another exemplary application, migration component 1408 can be configured to replicate or migrate selected sets of historian data from historians H1-HN to cloud storage on cloud platform 1402, allowing the data to be quickly retrieved by client devices 1412. Migration component 1408 can also replicate historian data residing on cloud storage back to historians H1-HN if required, providing a mechanism for reliable cloud-based backup storage of historian data. To facilitate access level granularity, cloud storage associated with cloud platform 1402 can be partitioned such that portions of cloud storage can be selectively masked or unmasked to respective parties. With cloud storage partitioned in this manner, migration component 1408 can be configured to migrate or replicate a first subset of historian data to a first partition having full public access settings, and a second subset of historian data to a second partition set as private, where access to historian data on the second partition is granted only to users having suitable access privileges.

In some embodiments, cloud-based historian data interface system 1404 can also be configured to perform cloud-side analytics on historian data stored in historians H1-HN, and generate reports, alarms, or notifications based on results of these analytics. For example, historian data interface system 1404 can include a notification component 1416 configured to issue notifications to selected client devices 1412 in response to a determination that a subset of historian data stored in historians H1-HN has met one or more predefined conditions. These conditions can include, for example, detecting that a particular process value has exceeded a defined setpoint, detecting a transition to a particular machine state, detecting an alarm condition, determining that a specified production goal has been achieved, or other such conditions that can be detected through analysis of the historian data.

When notification component 1416 detects an actionable condition within the historian data, it can identify one or more specific plant employees who are to receive the notification, as well as information identifying a user notification device, phone number, or email address for each person to be notified. Notification component 1416 can determine this notification information, for example, by cross-referencing a configuration file (not shown) that identifies which personnel are to be notified for a given type of condition, one or more notification methods for each identified person, and/or other relevant information. Notification component 1416 can access this configuration file to determine, for example, which personnel should be notified, which user devices should receive the notification, a required action to be taken by the recipient, a due date for the action, a format for the notification, and/or other relevant information. The configuration file can maintain multiple separate personnel lists respectively associated with different types of actionable situations. In some embodiments, the personnel list selected for a given notification can be at least partly a function of a context associated with the historian data, as determined by data model 1406. For example, if a subset of historian data indicates that a process parameter has exceeded a setpoint value, notification component 1416 can identify the list of personnel to receive the notification based on the facility, area, and/or workcell to which the process parameter relates.

It is to be appreciated that the common interface and framework described herein can be accessed and utilized across many types of devices, including but not limited to desktops, machines, equipment, mobile devices, cell phones, programmable logic controllers (PLCs), controllers, servers, mobile phones, tablets, etc. The common interface and framework can also be implemented as part of a user interface, browser, webpage, etc.

FIGS. 15-19 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 15:
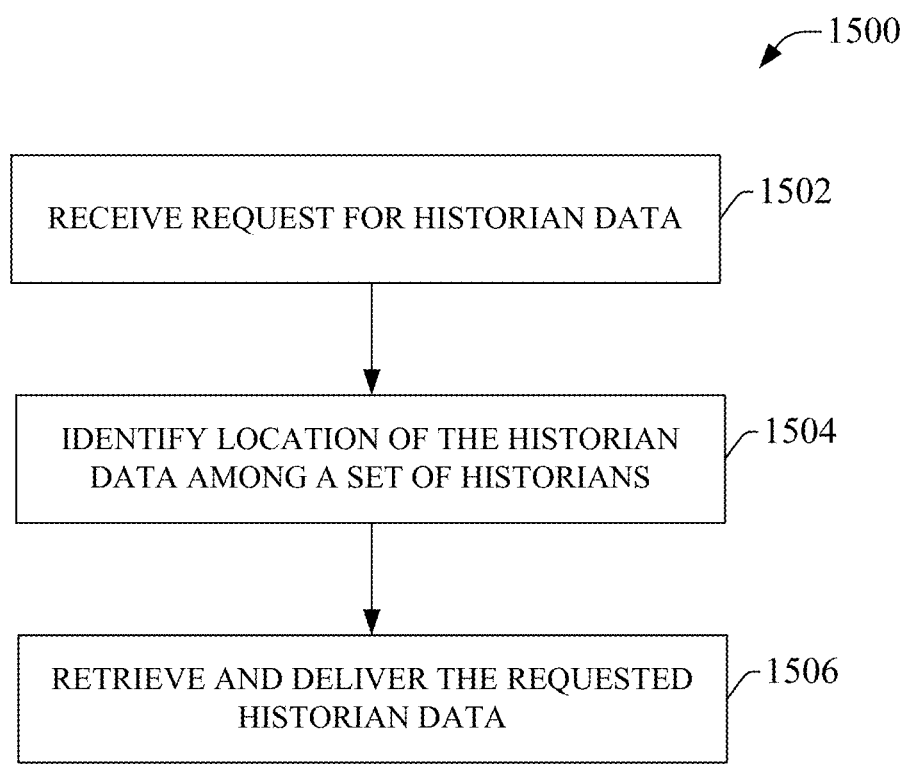
FIG. 15 is a flowchart of an example methodology for requesting and retrieving historian data.

FIG. 15 illustrates an example methodology 1500 for requesting and retrieving historian data. Initially, at 1502, a request for a subset of historian data is received. At 1504, the request is processed by a common interface, framework, or data model, and one or more locations of the subset of historian data are determined. The location of the desired historian data can be determined, for example by referencing indexed information and data joins stored in cache memory, as described above in connection with FIG. 6. Additionally, hash tables, look-up tables and the like can be employed to facilitate locating the desired historian data. These techniques can allow specified historian data to be located across a large set of historians distributed across multiple levels of an organizational hierarchy, and across multiple geographically diverse facilities of the enterprise. At 1506, the requested data is provided to the requestor. Methodology 1500 can free a requestor from requiring prior knowledge of where desired historian data is located within a distributed historian network.

Figure 16:
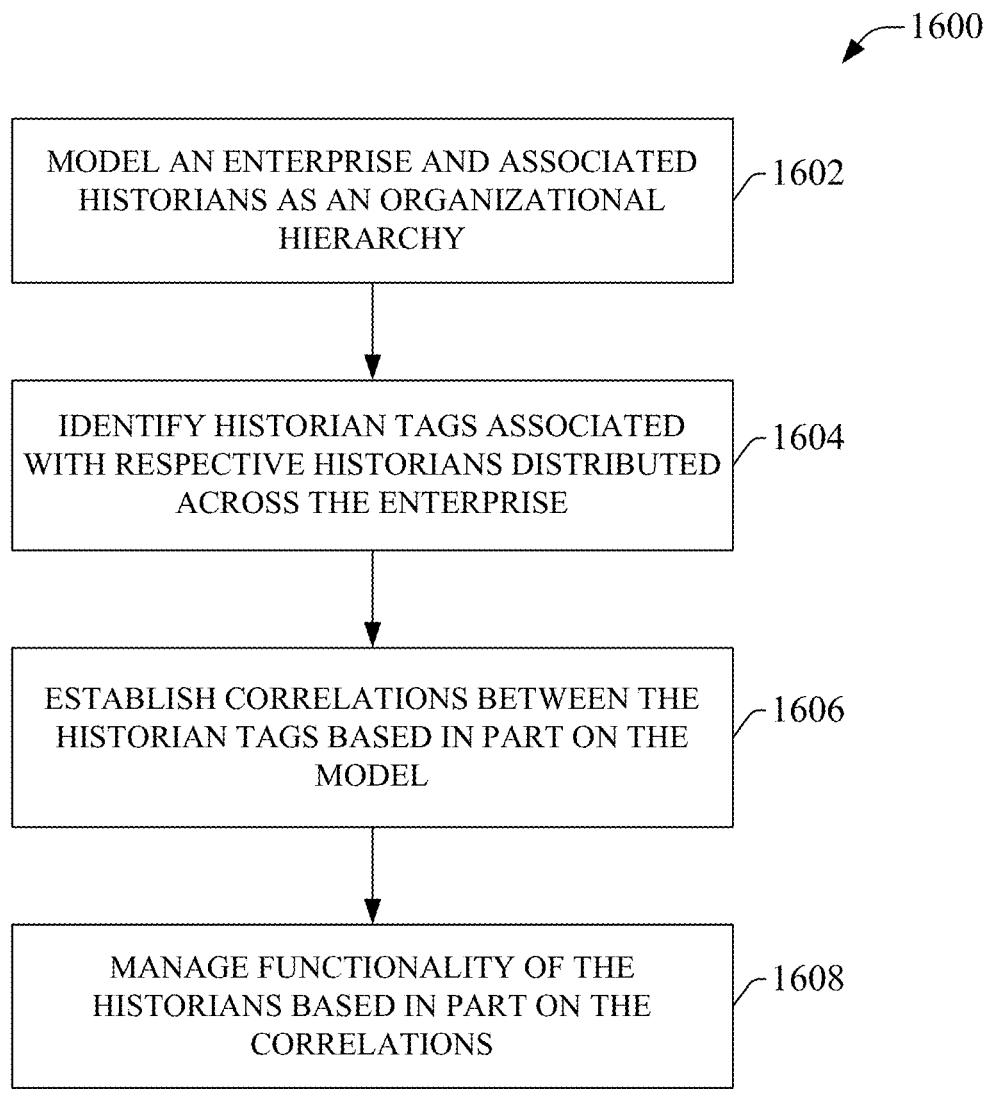
FIG. 16 is a flowchart of an example methodology for managing a pool of data historians using a unified protocol.

FIG. 16 illustrates an exemplary methodology 1600 for managing a pool of data historians using a unified protocol. Initially, at 1602, an industrial enterprise and its associated historians are modeled as an organizational hierarchy. The resulting data model can represent the industrial enterprise in terms of multiple hierarchical levels, including, for example, a workcell level, a line level, an area level, a site level, and an enterprise level. The data model can represent historians, industrial controllers, devices, machines, or equipment as data structures within this organizational hierarchy to provide context for data generated and stored throughout the enterprise relative to the organization as a whole.

At 1606, historian tags associated with respective historians distributed across the industrial enterprise are identified. This can be achieved, for example, by accessing the respective historians and determining available data items (e.g., data tags) available for retrieval from the respective historians. Historian tags can include historical data tags within machine or plant historians, real-time data tags within an industrial controller or live data server, data registers within a smart meter, or other such sources of data.

At 1608, correlations between the historian tags identified at 1606 can be established based in part on the model. For example, based on contexts provided by the data model, it can be determined that a first data tag representing a temperature value relates to a particular machine. Accordingly, the first data tag can be correlated with other tags relating to the same machine (e.g., a machine status tag). In another example, it may be determined, based on the data model, that multiple different data tags located on different historians represent the same data item. As such, these data tags can be correlated as representing the same data. The data model makes it possible to establish correlation between historian tags independently of the physical location of the respective tags. That is, correlations can be made between tags residing on different historians, or between tags residing at different facilities.

At 1610, functionality of the multiple historians is managed based in part on the correlations established at step 1608. For example, if a particular data item is requested at a common historian interface, and the correlations indicate that the requested data item is available from multiple different historian tags, a determination can be made regarding the best source from which to retrieve the requested data item (based, for example, on which historian is closest to the source of the request, which historian has the most available processing resources, etc.). In another example, if a historian currently responsible for collecting a particular data item is experiencing performance degradation as a result of becoming overloaded with processing tasks, a backup historian capable of collecting the data item can be identified based on the data model, and responsibility for collecting the data item can be shifted from the original historian to the backup historian.

Figure 17:
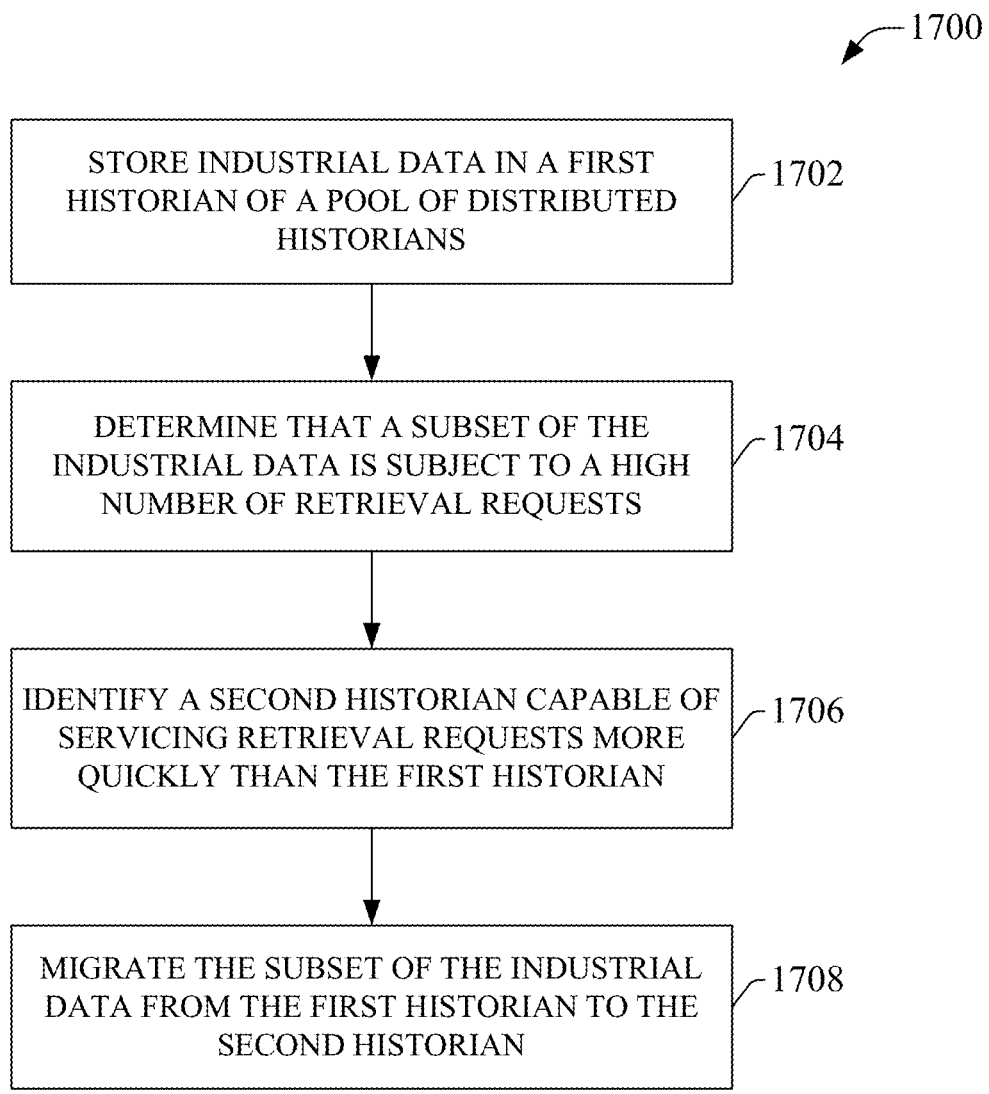
FIG. 17 is a flowchart of an example methodology for migrating historian data in order to improve response to data retrieval requests.

FIG. 17 illustrates an exemplary methodology 1700 for migrating historian data in order to improve response to data retrieval requests. Initially, at 1702, industrial data is stored in a first historian of a pool of historians distributed across one or more levels of an industrial enterprise. At 1704, a determination is made that a subset of the industrial data stored in the first historian is subject to a high number of retrieval requests. This determination can be made based on such factors as a raw number of received requests for the subset of the data, a frequency of such requests, an explicit indication that the subset of data will be retrieved frequently (e.g., in order to provide data to a reporting application that generates reports on an hourly or work shift basis), or other such criteria.

In response to the determination made at 1704, a second historian capable of serving high volumes of data retrieval requests more quickly than the first historian is identified at 1706. This determination can be made based, at least in part, on a data model of the enterprise that maintains nominal and/or actual processing capabilities of respective historians in the pool of historians. At 1708, the subset of historian data is migrated from the first historian to the second historian, thereby improving responsiveness of the system to requests for the subset of data.

Figure 18:
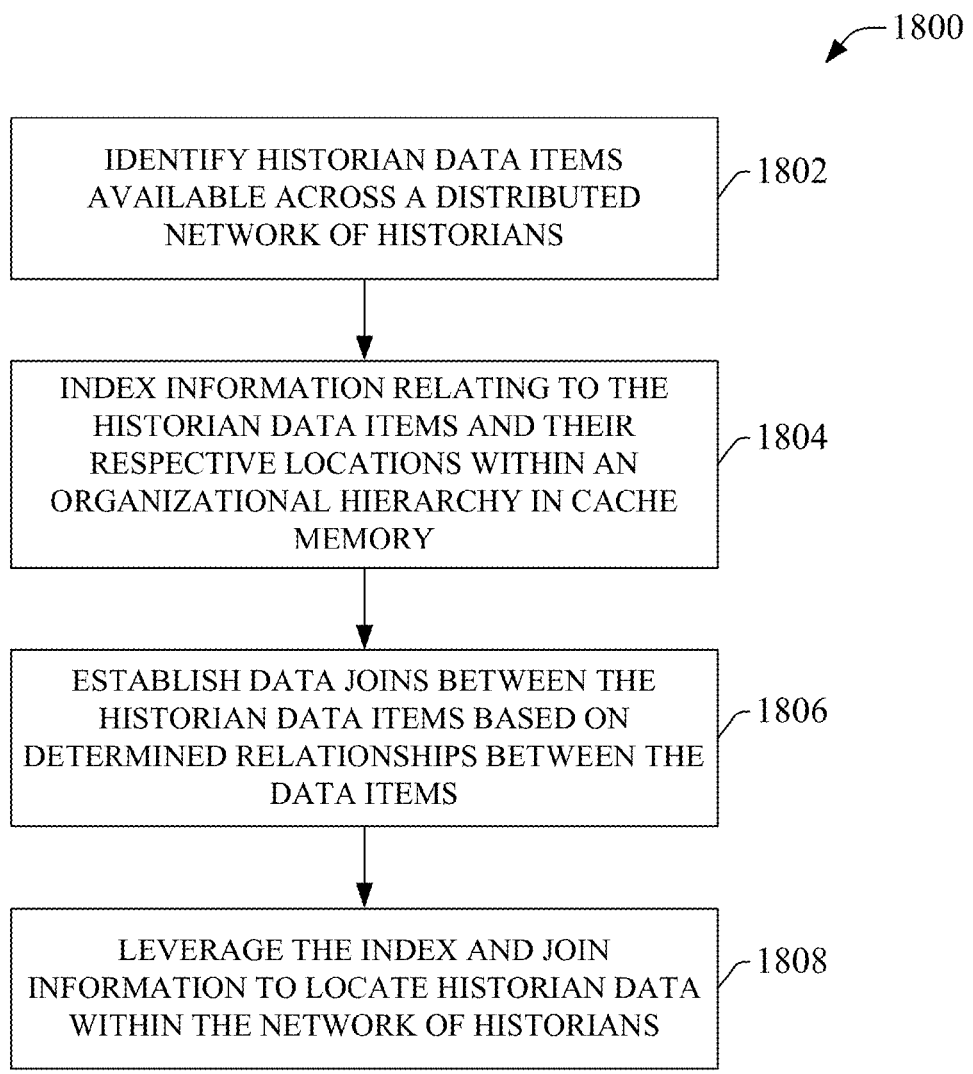
FIG. 18 is a flowchart of an example methodology for locating historian data within a network of historians.

FIG. 18 illustrates an exemplary methodology 1800 for locating historian data within a network of historians. Initially at 1802, historian data items available across a distributed network of historians are identified. At 1804, information relating to the historian data items and their respective locations within an organizational hierarchy is indexed in cache memory. This indexed information can include, for example, identifications of historians and their available historian data, data types of the available data, etc. The indexed information can also include information relating to equipment comprising one or more industrial control systems of an enterprise. The indexed information can be gathered using any suitable mechanism. For example, a crawler can be implemented that crawls the network of historians to discover their available data items, their respective locations, the data types of the respective data items, and other such information.

At 1806, data joins between the historian data items are established based on determined relationships between the data items. For example, a data model (e.g. data model 606) can be referenced to determine relationships between historian data items, and establish database joins between selected historian data items based on these determined relationships. At 1808, the index and join information created at steps 1804 and 1806 are leveraged to locate historian data within the network of historians.

Figure 19:
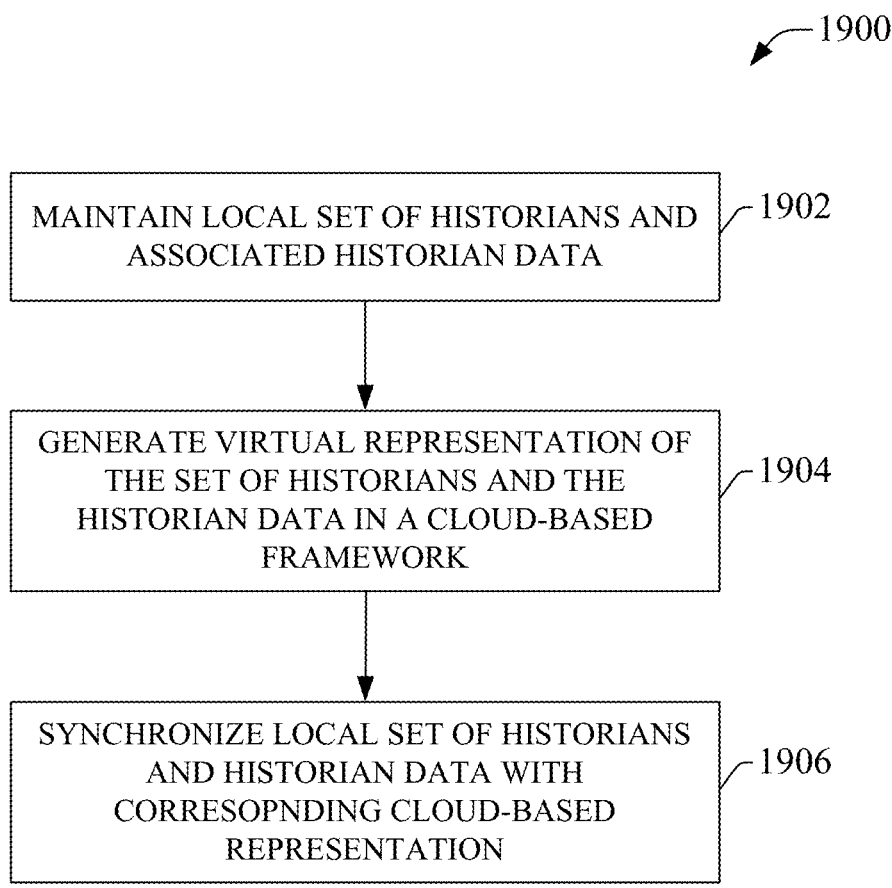
FIG. 19 is a flowchart of an example methodology for virtualizing a local set of historians and historian data in a cloud-based framework.

FIG. 19 illustrates an exemplary methodology 1900 for virtualizing a local set of historians and historian data in a cloud-based framework. At 1902, a local set of historians and historian data are maintained. The local set of historians can comprise, for example, a mesh network of historians distributed across one or more levels of an industrial enterprise, where available historian data is distributed across the network. At 1904, virtual representations of the historians and their associated historian data are generated in a cloud-based framework. This can comprise, for example, creating or replicating a data model representation of the local set of historians on the cloud platform. At 1906, the local set of historians and historian data are synchronized with the corresponding cloud-based virtualization.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
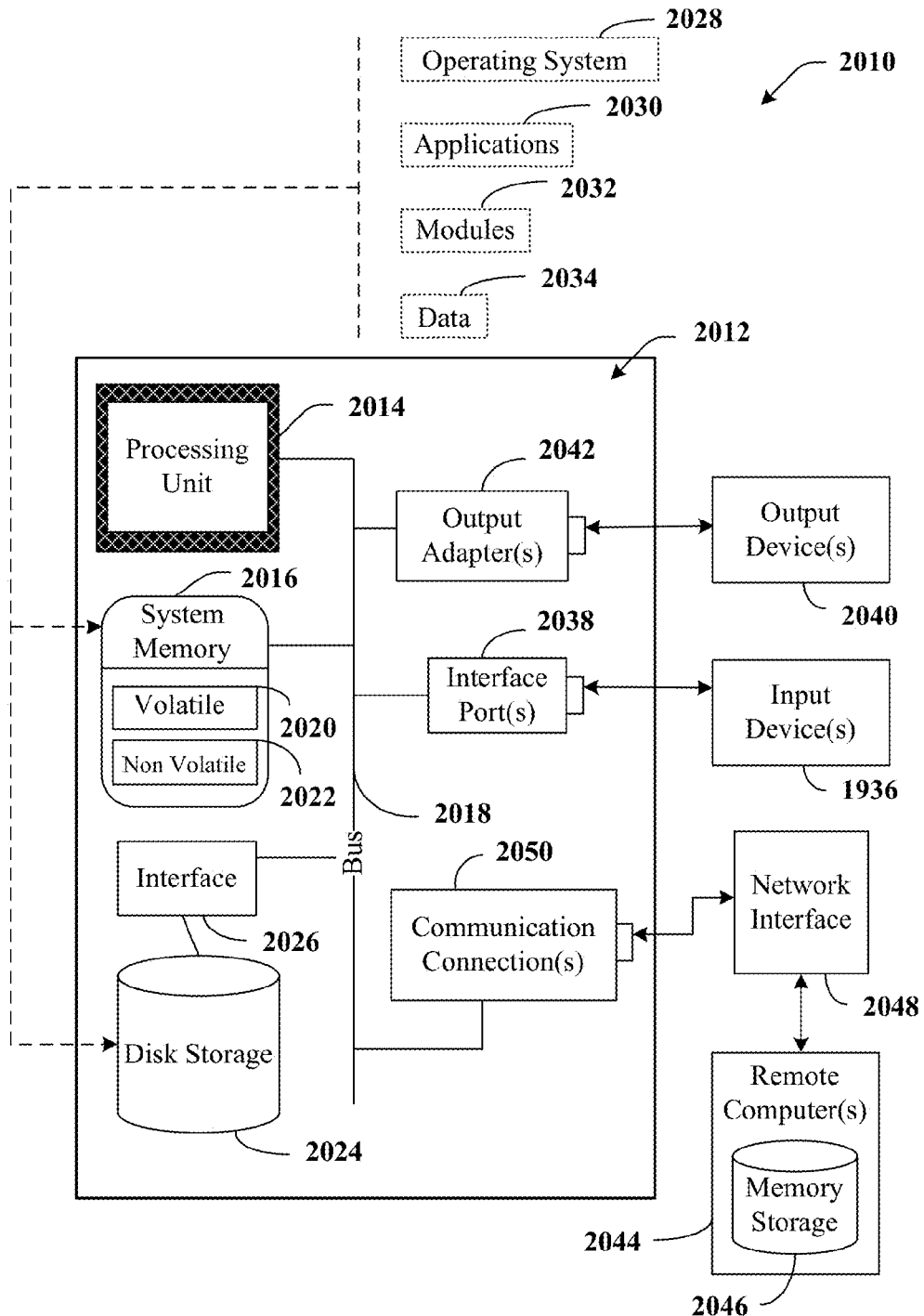
FIG. 20 is an example computing environment.
Figure 21:
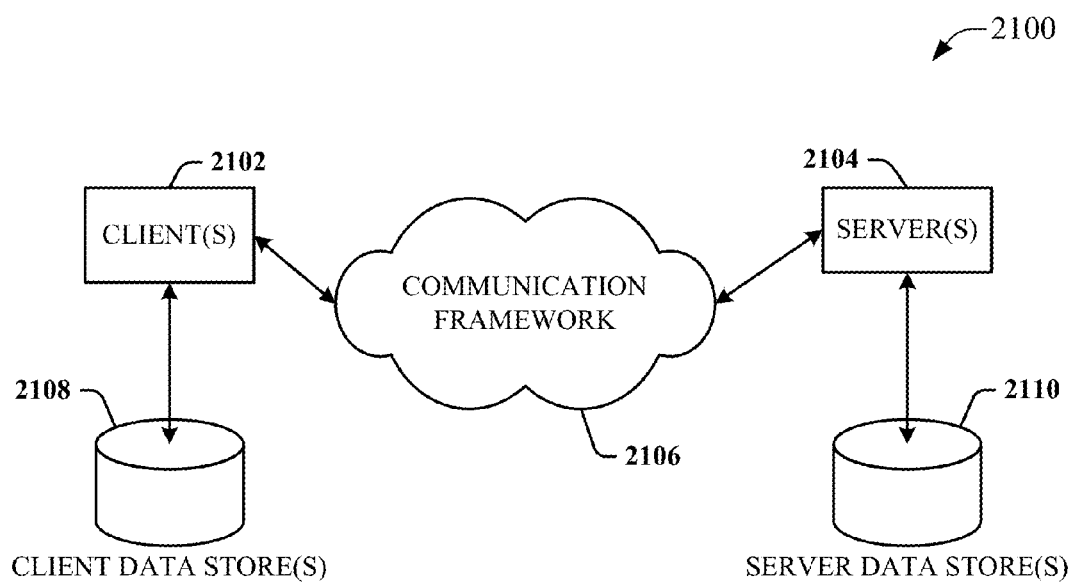
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented.

With reference to FIG. 20, an example environment 2010 for implementing various aspects of the aforementioned subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/non-volatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer 2012. System applications 2030 take advantage of the management of resources by operating system 2028 through program modules 2032 and program data 2034 stored either in system memory 2016 or on disk storage 2024. It is to be appreciated that one or more embodiments of the subject disclosure can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 1940 use some of the same type of ports as input device(s) 2036. Thus, for example, a USB port may be used to provide input to computer 2012, and to output information from computer 2012 to an output device 2040. Output adapter 2042 is provided to illustrate that there are some output devices (e.g., monitors, speakers, and printers, among other output devices) which require special adapters. The output adapter 2042 includes, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 1948 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

FIG. 21 is a schematic block diagram of a sample computing environment 2100 with which the disclosed subject matter can interact. Sample computing environment 2100 includes one or more client(s) 2102. The client(s) 2102 can be hardware and/or software (e.g., threads, processes, computing devices). Sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. Sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system, comprising:
   at least one non-transitory computer-readable medium having stored therein computer-executable components; and
   at least one processor that executes the following computer-executable components stored on the at least one non-transitory computer readable medium:
      a data model component that maintains a data model that defines multiple hierarchical levels of an industrial enterprise and models correlations between historian data stored on a set of historian devices in terms of the multiple hierarchical levels;
      an access component that
         receives a request for access to a data item of the historian data,
         identifies, based on the correlations defined by the data model, at least two historian devices of the set of historian devices that store duplicate instances of the data item, and
         selects a historian device, of the at least two historian devices, from which to retrieve the data item based on respective locations of the at least two historian devices relative to a location of origination of the request; and
      an interface component configured to display the data item retrieved from the historian device.

2. The system of claim 1, further comprising a migration component that relocates a portion of the historian data stored at a first historian device to a second historian device, wherein the first historian device and the second historian device are included in the set of historians devices.

3. The system of claim 2, wherein the migration component relocates the portion of the historian data in response to a determination that a frequency of access requests for the portion of the historian data exceeds a defined frequency.

4. The system of claim 3, wherein the migration component selects the second historian device based on a location of origination of the access requests.

5. The system of claim 1, further comprising a caching component that caches subsets of the historian data as a function of at least one of a volume of access requests, a frequency of the access requests, a location of origination of the access requests, or respective importance levels determined for the subsets of the historian data.

6. The system of claim 5, wherein the caching component ranks the subsets of the historian data, and caches the subsets of the historian data in hierarchical layers according to ranking.

7. The system of claim 6, wherein the access component retrieves the subsets of the historian data from the hierarchical layers and displays the subsets of the historian data as a graphical representation that progressively updates over time as the subsets of the historian data are retrieved from the respective hierarchical layers.

8. The system of claim 1, further comprising a cloud interface component that synchronizes at least a portion of the historian data to a virtual representation of the set of historians on a cloud platform.

9. The system of claim 1, wherein at least one of the data model, the access component, or the interface component resides on a cloud platform.

10. The system of claim 1, wherein the interface component renders a tag cloud representation of a subset of the historian data, the tag cloud representation comprises a set of operating state indicators, and an operating state indicator of the set of operating state indicators has a size that is a function of a duration of time that an operating state corresponding to the operating state indicator was in effect for a time period represented by the subset of the historian data.

11. The system of claim 1, wherein the multiple hierarchical levels comprise at least an enterprise level, a plant level, and a machine level.

12. The system of claim 1, further comprising a join component configured to discover a relationship between a first data tag on a first historian device of the set of historian devices and a second data tag on a second historian device of the set of data historian devices based on the data model, wherein the data model component is further configured to create, in the data model, a record of a data join between the first data tag and the second data tag based on the relationship.

13. The system of claim 1, wherein the data model defines an association between a real-time data value stored in a first historian device and a corresponding historical data value stored in a second historian device.

14. A method, comprising:
   using at least one processor executing computer-executable instructions embodied on at least one non-transitory computer-readable medium to perform operations, the operations comprising:
      defining multiple hierarchical levels of an industrial enterprise;
      modeling correlations between data tags associated with historian data located on a plurality of historian devices distributed across one or more levels of the industrial enterprise in terms of the multiple hierarchical levels to yield a data model;
      receiving a request for a subset of the historian data associated with a data tag of the data tags;
      in response to receiving the request, determining, based on correlations modeled by the data model, that the subset of historian data is replicated on at least two historian devices of the plurality of historian devices;
      selecting a historian device of at least two historian devices from which to retrieve the subset of the historian data based on a comparison of locations of the at least two historian devices relative to a location from which the request for the subset of the historian data is received; and retrieving the subset of historian data from the historian device.

15. The method of claim 14, the operations further comprising:

in response to determining that a volume of access requests for a portion of the historian data stored on a first subset of the plurality of historian devices exceeds a defined setpoint, migrating the portion of the historian data from the first historian device to a second historian device of the plurality of historian devices.

16. The method of claim 15, the operations further comprising selecting the second historian device based on a location the second historian device relative to a location of origination of the access requests.

17. The method of claim 14, the operations further comprising caching selected subsets of the historian data based on at least one of a number of access requests, a frequency of the access requests, a location from which the access requests are received, or respective importance of the subsets of the historian data.

18. The method of claim 17, the operations further comprising:

ranking the selected subsets of the historian data; and caching the selected subsets of the historian data among caching layers according to ranking.

19. The method of claim 14, the operations further comprising generating a virtual representation of the plurality of historian devices on a cloud platform.

20. The method of claim 14, wherein the modeling the correlations comprises modeling a correlation between a real-time data value stored in a first historian device and a historical data value corresponding to the real-time data value stored in a second historian device.

21. A non-transitory computer-readable medium having stored thereon computer-executable instructions that, in response to execution by a system including a processor, cause the system to perform operations, the operations comprising:

generating a data model representing multiple historian devices and correlations between historian data stored on the multiple historian devices in terms of multiple hierarchical levels of an industrial enterprise on which the multiple historian devices reside;

receiving a request to retrieve a portion of the historian data associated with a data tag;

identifying, based on the correlations defined by the data model, that the portion of the historian data is duplicated on two or more historian devices of the multiple historian devices;

selecting a historian device, of the two or more historian devices, from which to retrieve the portion of the historian data based on respective locations of the two or more historian devices relative to a location from which the request was received; and retrieving the portion of the historian data from historian device.

22. The computer-readable medium of claim 21, the operations further comprising:

determining that a volume of requests for the portion of the historian data exceeds a defined setpoint;

identifying an available historian device, of the multiple historian devices, capable of servicing the access requests more quickly than the two or more historian devices; and relocating the portion of the historian data from the two or more historian devices to the available historian device in response to the determining.

* * * * *